(12) United States Patent
Yang et al.

(10) Patent No.: US 10,413,984 B2
(45) Date of Patent: Sep. 17, 2019

(54) METHOD FOR PREDICTING PRECISION OF ELECTRICAL DISCHARGE MACHINE

(71) Applicant: METAL INDUSTRIES RESEARCH & DEVELOPMENT CENTRE, Kaohsiung (TW)

(72) Inventors: Haw-Ching Yang, Tainan (TW); Min-Nan Wu, Kaohsiung (TW); Cheng-Yen Chen, Kaohsiung (TW); Wen-Chieh Wu, Taichung (TW); Chia-Ming Jan, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 111 days.

(21) Appl. No.: 15/835,425

(22) Filed: Dec. 7, 2017

(65) Prior Publication Data

US 2018/0161900 A1 Jun. 14, 2018

(30) Foreign Application Priority Data

Dec. 8, 2016 (TW) .............................. 105140656 A
Nov. 6, 2017 (TW) .............................. 106138337 A

(51) Int. Cl.
| | |
|---|---|
| *G06F 19/00* | (2018.01) |
| *B23H 7/20* | (2006.01) |
| *G05B 13/04* | (2006.01) |
| *B23H 1/02* | (2006.01) |
| *G05B 19/418* | (2006.01) |
| *B23H 7/02* | (2006.01) |

(52) U.S. Cl.
CPC ................ *B23H 7/20* (2013.01); *B23H 1/02* (2013.01); *G05B 13/041* (2013.01);
(Continued)

(58) Field of Classification Search
CPC .......... A61K 31/13; A61P 25/18; A61P 25/32; A61P 29/00
See application file for complete search history.

(56) References Cited

U.S. PATENT DOCUMENTS

| | | |
|---|---|---|
| 5,410,117 A | 4/1995 | Reynier et al. |
| 6,717,094 B2 * | 4/2004 | Beaumont ................ B23H 1/02 |
| | | 219/69.14 |

(Continued)

FOREIGN PATENT DOCUMENTS

| | | |
|---|---|---|
| CN | 102781616 A | 11/2012 |
| CN | 104368886 A | 2/2015 |

(Continued)

*Primary Examiner* — Kidest Bahta
(74) *Attorney, Agent, or Firm* — CKC & Partners Co., LLC

(57) ABSTRACT

A method for predicting precision of an electrical discharge machine is provided. In the method, plural sets of process data are obtained while the electrical discharge machine processes workpiece samples. Process features are established based on the process data. Each of the workpiece samples with respect to each of at least one measurement item is measured by using a metrology tool, thereby obtaining measurement values of the workpiece samples with respect to each measurement item. A correlation analysis operation is performed to obtain correlation coefficients. At least one key feature is selected from the process features as representative according to the correlation coefficients. The measurement values of the workpiece samples with respect to each measurement item, and the sets of process data corresponding to the key features are used to build a predictive model for predicting the precision of the electrical discharge machine.

13 Claims, 27 Drawing Sheets
(23 of 27 Drawing Sheet(s) Filed in Color)

(52) U.S. Cl.
CPC ......... *G05B 19/41875* (2013.01); *B23H 7/02* (2013.01); *G05B 2219/32194* (2013.01); *G05B 2219/45221* (2013.01)

(56) References Cited

U.S. PATENT DOCUMENTS

| | | | |
|---|---|---|---|
| 8,095,484 B2 | 1/2012 | Cheng et al. | |
| 2006/0054598 A1* | 3/2006 | Awakura | B23H 7/265 219/50 |
| 2011/0174783 A1* | 7/2011 | Suzuki | B23H 7/265 219/69.15 |
| 2011/0282480 A1* | 11/2011 | Jang | G05B 19/41875 700/110 |
| 2014/0008241 A1* | 1/2014 | Gunther | B23H 7/28 205/645 |

FOREIGN PATENT DOCUMENTS

| | | |
|---|---|---|
| CN | 104487196 A | 4/2015 |
| CN | 105499726 A | 4/2016 |
| TW | 386921 B | 4/2000 |
| TW | 200408481 A | 6/2004 |
| TW | 201333484 A | 8/2013 |
| TW | I459169 B | 11/2014 |
| TW | I489232 B | 6/2015 |
| TW | M513082 U | 12/2015 |
| TW | M527360 U | 8/2016 |

* cited by examiner

METHOD FOR PREDICTING PRECISION OF ELECTRICAL DISCHARGE MACHINE

RELATED APPLICATIONS

This application claims priority to Taiwan Application Serial Number 105140656, filed on Dec. 8, 2016, and Taiwan Application Serial Number 106138337, filed on Nov. 6, 2017. The entire contents of each of which are incorporated by reference.

BACKGROUND

Field of Invention

The present invention relates to a method for predicting precision of a machine tool. More particularly, the present invention relates to a method for predicting precision of an electrical discharge machine.

Description of Related Art

Generally, during an operation of an electrical discharge machine, various factors such as poor slag removal, abnormal short circuit, or electrode consumption often result in undesirable size and surface roughness of workpieces, thus leading to poor quality of the workpieces. A conventional electrical discharge machine does not have a function or scheme to predict the production quality of the workpieces during or right after the processing of the workpieces. Instead, the quality of the workpieces can only be measured by using a metrology tool after the workpieces are finished and sent to the metrology tool, which is time-consuming and inefficient.

The amount of process data used to operate the electrical discharge machine to process the workpieces is tremendous. In order to overcome the aforementioned problem that the quality of the workpieces cannot be detected while or right after the workpieces are processed by the electrical discharge machine, key features of the process data used to operate the electrical discharge machine have to be found for building a predictive system.

SUMMARY

An object of the invention is to provide a method for predicting precision of an electrical discharge machine, in which plural process features are effectively established from process data of the electrical discharge machine, and key features affecting production quality and precision of the electrical discharge machine are selected from the process features, so as to provide a predictive system for predicting the precision of the electrical discharge machine, thus improving the quality of workpiece by adjusting process data of the electrical discharge machine.

According to the aforementioned object, a method for predicting precision of an electrical discharge machine is provided. The method includes the following operations. At first, plural sets of process data are obtained while the electrical discharge machine processes plural workpiece samples, in which each set of the process data includes plural discharge voltage signals and plural discharge current signals. Thereafter, plural process features are established based on the process data. Then, each of the workpiece samples with respect to each of at least one measurement item is measured by using at least one metrology tool, thereby obtaining plural measurement values of the workpiece samples with respect to each of the at least one measurement item, in which each of the measurement values is an actual measurement value of one of the workpiece samples after the one of the workpieces is processed by the electrical discharge machine according to its corresponding set of process data. Thereafter, a correlation analysis operation is performed to obtain plural correlation coefficients between the process features of the workpiece samples and the measurement values of the workpiece samples with respect to each of the at least one measurement item. Then, at least one key feature is selected from the process features as representative according to the correlation coefficients. Thereafter, the measurement values of the workpiece samples with respect to each of the measurement items and the sets of process data corresponding to the key features are used to build a predictive model corresponding to each of the measurement items. Then, the electrical discharge machine is operated to machine a workpiece, and a set of first process data is collected while the electrical discharge machine machines the workpiece. Thereafter, the set of first process data is converted into a set of input data corresponding to the key feature. Then, the set of input data is put into the predictive model to conjecture a predicted measurement value of the workpiece with respect to one of the at least one measurement item, thereby predicting the precision of the electrical discharge machine.

According to the aforementioned object, another method for predicting precision of an electrical discharge machine is provided. The method includes the following operations. At first, plural sets of process data are obtained while the electrical discharge machine processes plural workpiece samples, in which each set of the process data includes plural discharge voltage signals and a plurality of discharge current signals. Thereafter, plural process features are established based on the process data. Then, plural sets of sample data which correlate to the each of the process features are collected. Thereafter, distribution fitting is performed to each of the sets of the sample data correlating to each of the process features by using a probability fitting method, so as to determine whether a mean value and a standard deviation of each set of the sample data represent each of the process features, thereby obtaining a determination result. Then, each of the workpiece samples with respect to each of at least one measurement item is measured by using at least one metrology tool, thereby obtaining a plurality of measurement values of the workpiece samples with respect to each of the at least one measurement item, in which each of the measurement values is an actual measurement value of one of the workpiece samples after the one of the workpieces is processed by the electrical discharge machine according to its corresponding set of process data. Thereafter, a correlation analysis operation is performed to obtain plural correlation coefficients between the process features of the workpiece samples and the measurement values of the workpiece samples with respect to each of the at least one measurement item. Then, at least one key feature is selected from the process features as representative according to the correlation coefficients. Thereafter, the measurement values of the workpiece samples with respect to each of the measurement items and the sets of process data corresponding to the key features are used to build a predictive model corresponding to each of the measurement items. Then, the electrical discharge machine is operated to machine a workpiece, and a set of first process data is collected while the electrical discharge machine machines the workpiece. Thereafter, the set of first process data is converted into a set of input data corresponding to the key feature. Then, the set of input data is put into the predictive model to conjecture a predicted measurement value of the workpiece with respect to one of the at least one measurement item, thereby predicting the precision of the electrical discharge machine.

It can be known from the above that, the process features are established by using the process data such as the discharge voltage signals and the discharge current signals that are collected from the electrical discharge machine, and the key features are selected from the process features and are provided for building an accurate predictive system to predict the precision of the electrical discharge machine, thereby increasing the processing quality.

On the other hand, the probability fitting method is used to select appropriate data from a huge amount of sample data to represent each of the process features. Meanwhile, the probability fitting method also may be used to reliably determine whether the mean value and the standard deviation of each set of the sample data represent the corresponding process features.

BRIEF DESCRIPTION OF THE DRAWINGS

The patent or application file contains at least one drawing executed in color. Copies of this patent or patent application publication with color drawing(s) will be provided by Office upon request and payment of the necessary fee. The invention can be more fully understood by reading the following detailed description of the embodiment, with reference made to the accompanying drawings as follows.

DETAILED DESCRIPTION

Figure 1:
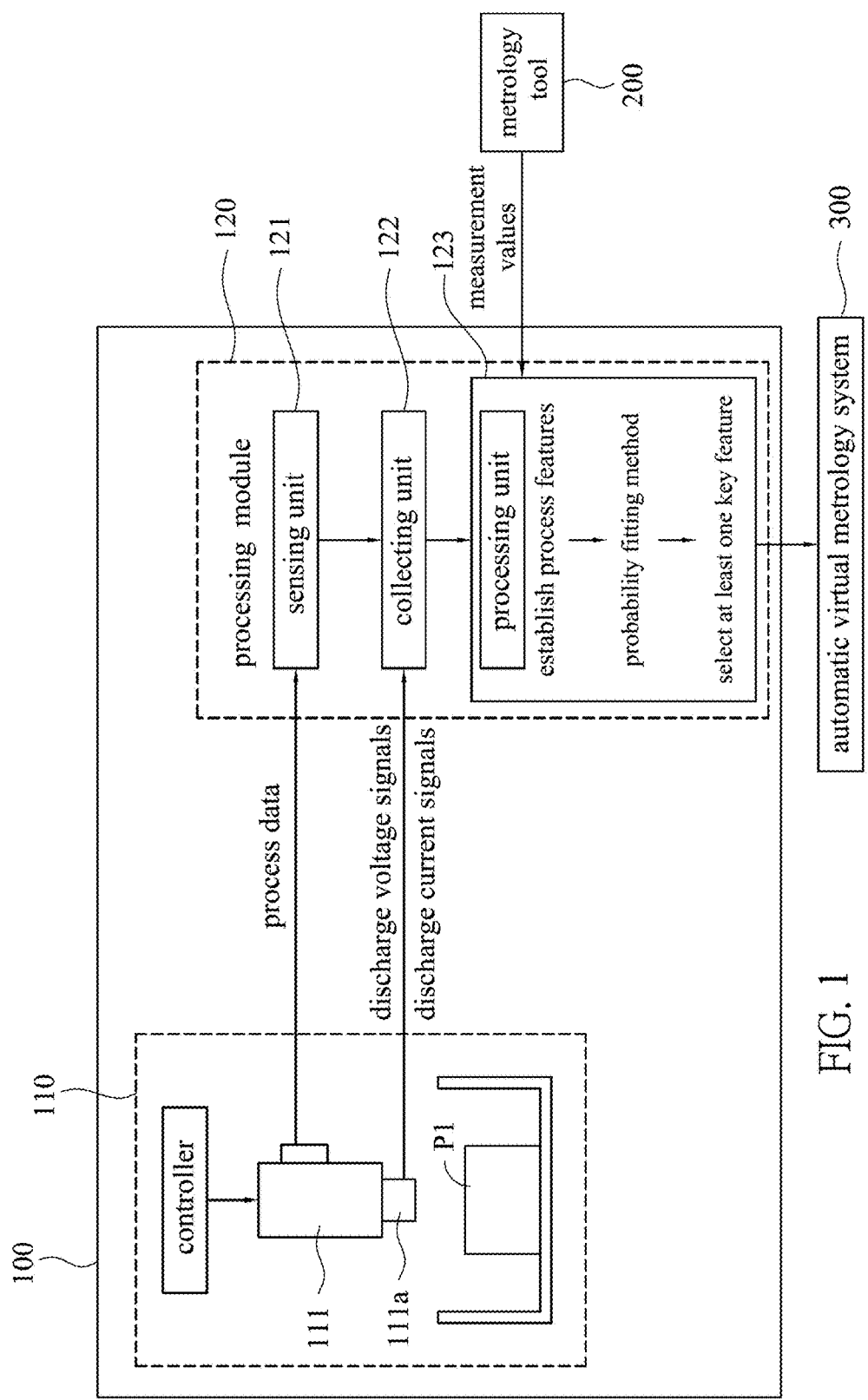
FIG. 1 is a schematic structural diagram showing an electrical discharge device in accordance with an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
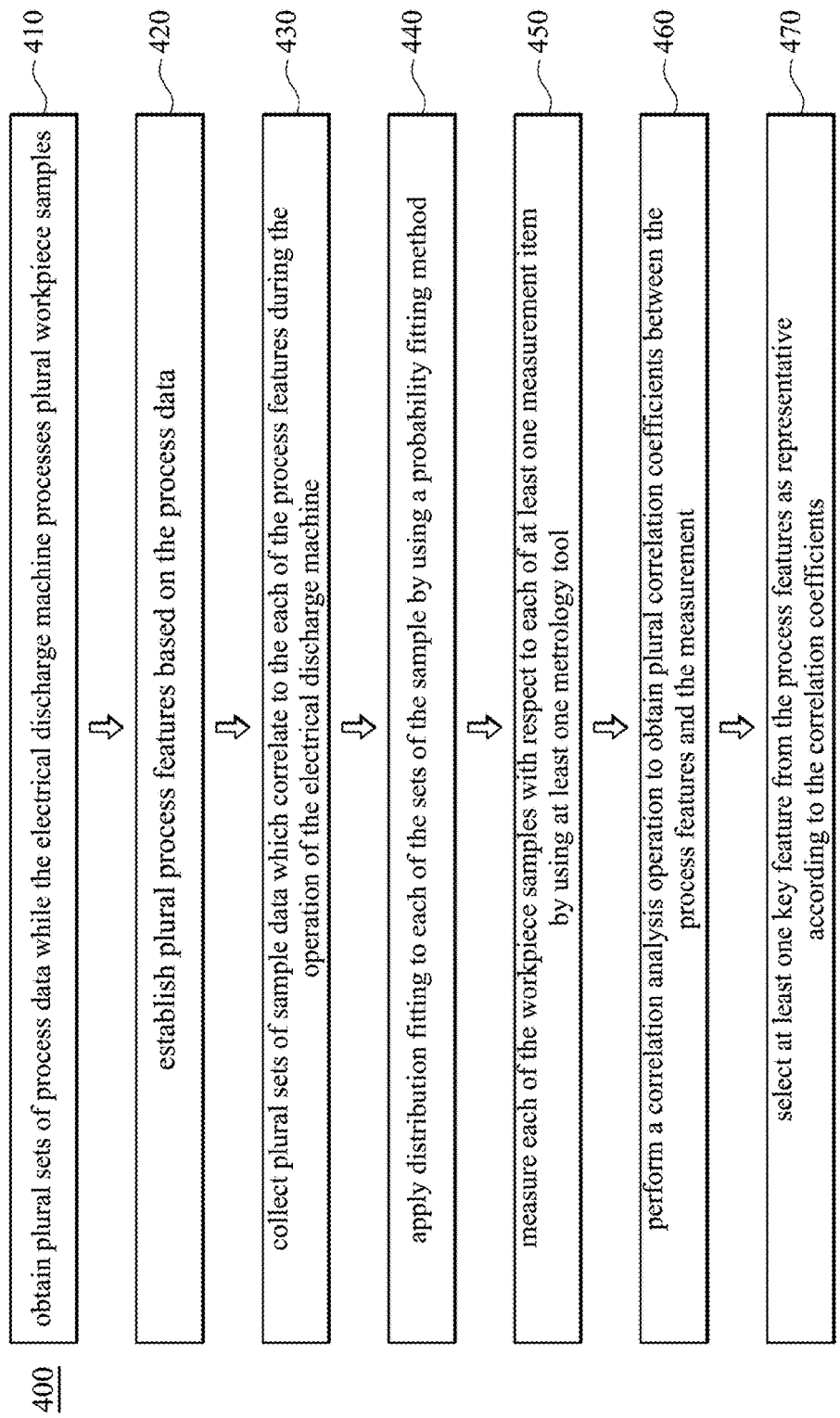
FIG. 2 is a flow chart showing a method for extracting key features for predicting precision of the electrical discharge machine in accordance with an embodiment of the present invention.

Referring to FIG. 1 and FIG. 2, FIG. 1 is a schematic structural diagram showing an electrical discharge device 100 in accordance with an embodiment of the present invention, and FIG. 2 is a flow chart showing a method 400 for extracting key features for predicting precision of the electrical discharge machine 100 in accordance with an embodiment of the present invention. The method 400 for extracting key features for predicting precision can be implemented by the electrical discharge device 100 shown in FIG. 1. The electrical discharge device 100 includes an electrical discharge machine 110 and a processing module 120 electrically connected to the electrical discharge machine 110. The electrical discharge machine 110 has a main shaft 111, and the main shaft 111 has an electrode 111a which is configured to machine plural workpiece samples P1. The processing module 120 includes a sensing unit 121, a collecting unit 122 and a processing unit 123. The sensing unit 121 is mainly used to generate a sensing signal, thereby providing for the collecting unit 122 to determine whether to collect the process data while the electrical discharge machine machines the workpiece samples. The processing unit 123 is configured to establish plural process features based on the process data, and is configured to select at least one key feature from the process features based on the measurement values measured from each of the workpiece samples with respect to each of at least one measurement item, thereby providing for an automatic virtual metrology system to predict the precision of the electrical discharge machine 110. In some examples, the measurement values with respect to different measurement items of each of the workpiece samples can be measured by different metrology tools 200.

In one embodiment, the sensing unit 121 is a laser range finding device which is disposed on the main shaft 111. Therefore, the collecting unit 122 can sense the position of the electrode 111a by the laser range finding device to determine whether to collect the process data (i.e. voltage signals and current signals) of the electrical discharge machine 110. For example, the laser range finding device is used to determine whether the main shaft 111 moves in a feeding direction. When the determination result is yes, meaning the main shaft 111 is moving in the feeding direction, the collecting unit 122 will further collect the process data while the electrical discharge machine 110 machines the workpiece samples P1. On the contrary, when the determination result is no, the collecting unit 122 does not have to collect any process data from the electrical discharge machine 110. Therefore, collecting unit 122 can efficiently collect required process data according to the determination result generated from the sensing unit 121. In other embodiments, the sensing unit 121 is an optical scale. In other embodiments, the collecting unit 122 can collect position data of the electrode 111a according to a coordinate position recorded in a controller of the electrical discharge machine 110 to determine whether to collect the process data, thereby collecting the required process data efficiently.

Figure 3:
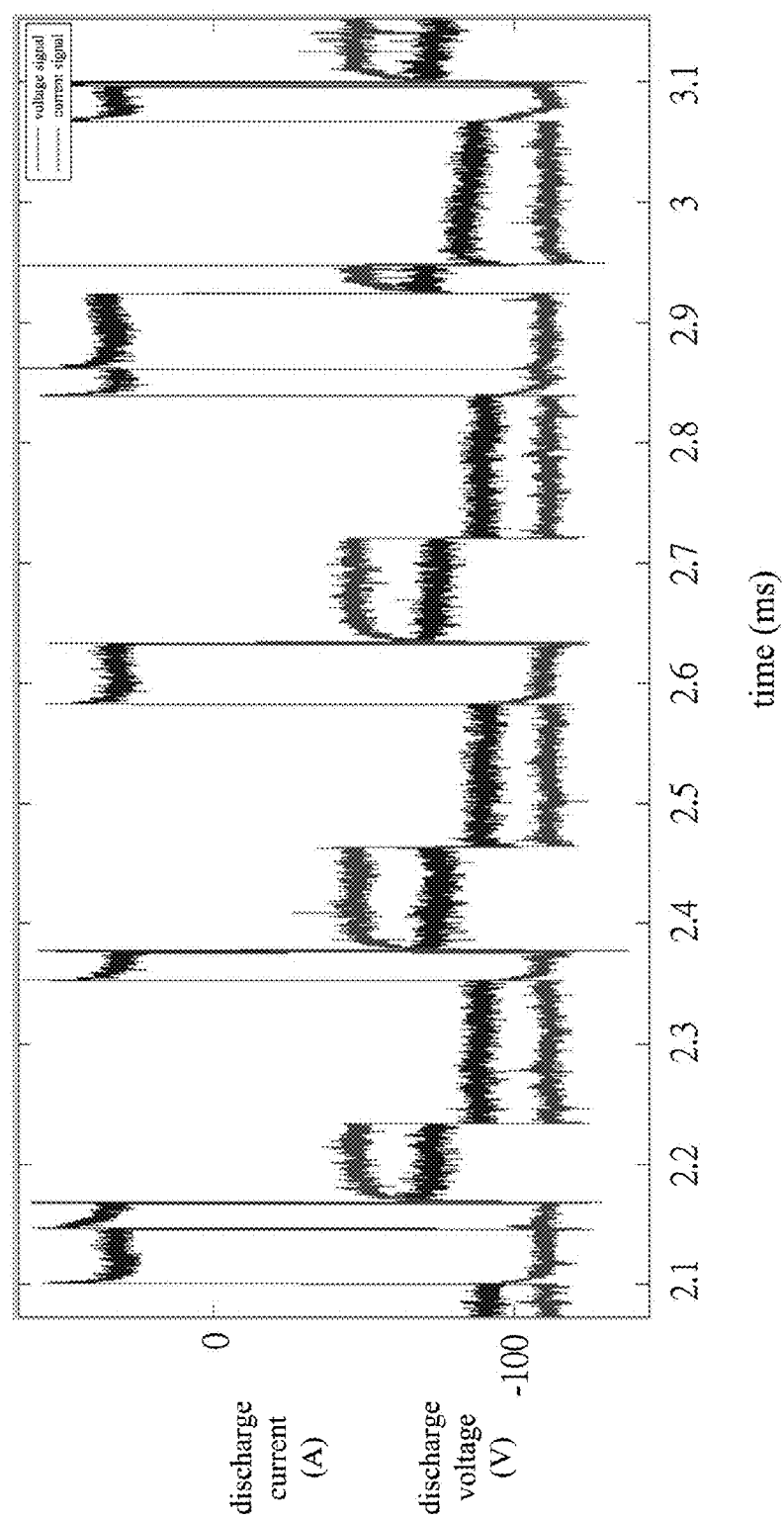
FIG. 3 is a schematic diagram showing relationships between time and discharge current/discharge voltage.

Referring to FIG. 1 to FIG. 3, FIG. 3 is a schematic diagram showing relationships between time and discharge current/discharge voltage. The method 400 for extracting key features is first to collect the process data (e.g. discharge voltage signals and discharge current signals shown in FIG. 3) during the operation of the electrical discharge machine 100 according to a processing instruction and the characteristic of the workpiece samples, and then to establish the process features according to the process data, and then to select at least one key feature from the process features for predicting the precision of the electrical discharge machine by a data fusion technique. The key feature is used to be provided for a predictive system to predict the precision of the electrical discharge machine.

Referring to FIG. 2 and FIG. 3, the method 400 for extracting the key features includes the following operations. First, an operation 410 is performed to obtain plural sets of process data while the electrical discharge machine processes plural workpiece samples. In one embodiment, each set of the process data comprises plural discharge voltage signals and plural discharge current signals. In one example, the process data is plural processing conditions (such aspen a circuit voltage and a pulse on/off time) of the electrical discharge machine and a machine status (such as an actual discharge voltage waveform and a discharge current waveform). In the present embodiment, the discharge voltage signals and the discharge current signals of the electrical discharge machine can be obtained by a high voltage probe and a current clamp.

Figure 4:
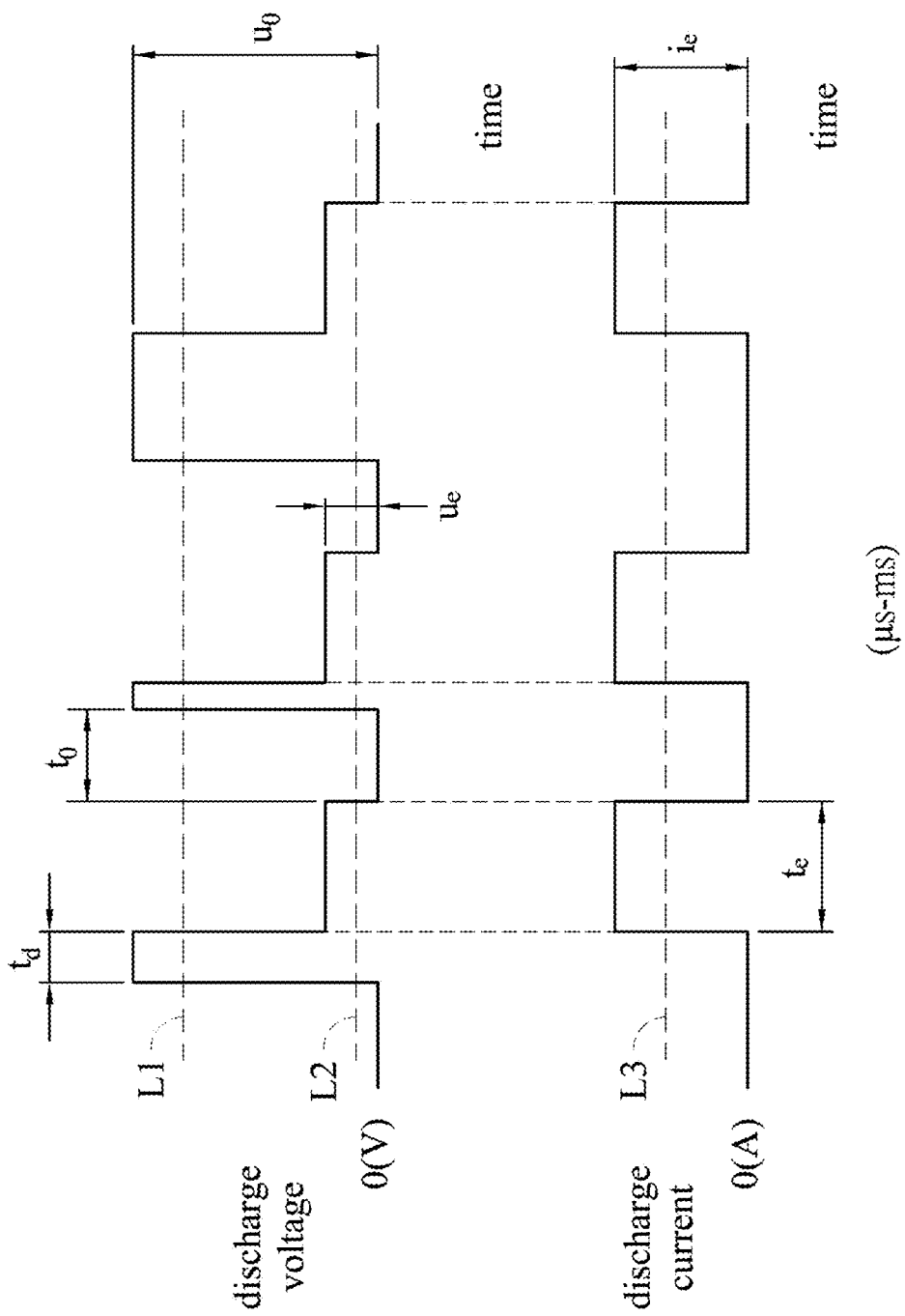
FIG. 4 is a schematic diagram illustrating simplified waveforms of discharge current and discharge voltage.

After the process data of the electrical discharge machine is obtained. An operation 420 is performed to establish plural process features based on the process data. In the present embodiment, the process features can be established by the data fusion technique, and these process features can be used to predict the precision of the electrical discharge machine. Before the process features are established, the discharge voltage waveform and the discharge current waveform shown in FIG. 3 can be used to establish a threshold value to collect data related to an effective waveform, such as a duration of the effective waveform, or the occurrence number of pulse or peak. Referring to FIG. 4, FIG. 4 is a schematic diagram illustrating simplified waveforms of discharge current and discharge voltage. The waveforms of the current and voltage in FIG. 4 are simplified to be clearly described, in which "$t_d$" in FIG. 4 represents "ignition delay time" or "charging time", "$t_e$" in FIG. 4 represents "discharge duration time", "$t_o$" in FIG. 4 represents "pulse interval time", "$u_o$" in FIG. 4 represents "open voltage", and "$i_e$" in FIG. 4 represents "discharge current". The threshold value can be preset by an experiment requirement. As shown in FIG. 4, a line L1 is used to indicate a threshold value for calculating the number of peak, a line L2 is used to indicate a threshold value for determining whether a short circuit has occurred, and a line L3 is used to indicate a threshold value for defining peak value. The operation of collecting the effective waveform time includes calculating the starting points and the ending points of each current peak and their duration time, and calculating the starting points and the ending points of each off voltage peak and their duration time.

In the present embodiment, the process features includes a spark frequency, an open circuit ratio, a short circuit ratio, an average short circuit time, a standard deviation of short circuit time, an average short circuit current, a standard deviation of short circuit current, an average delay time, a standard deviation of delay time, an average discharge peak current, a standard deviation of peak current, an average discharge duration, a standard deviation of discharge duration, an average discharge energy and a standard deviation of discharge energy.

Figure 5:
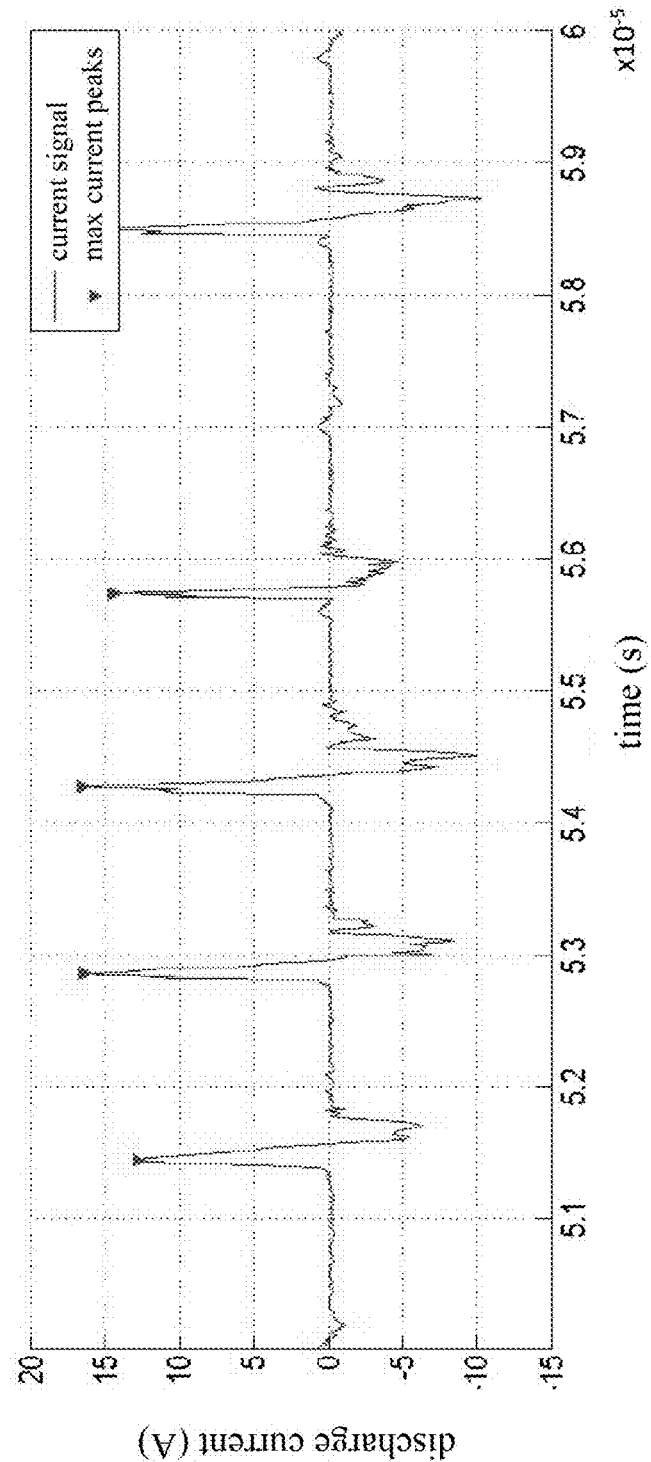
FIG. 5 is a schematic diagram showing a relationship between discharge current and time.

In the process features, the spark frequency, the average discharge peak current, the standard deviation of peak current, the average discharge duration and the standard deviation of discharge duration are mainly established based on the discharge current signals. The spark frequency represents the total number of sparks occurring during the signal period. Referring to FIG. 5, FIG. 5 is a schematic diagram showing a relationship between discharge current and time. To identify the sparks in the current signals, a pulse time range and a minimum peak threshold value (line L3 shown in FIG. 4) are defined in the diagram of a relationship between current and time as shown in FIG. 5. In the pulse time range, when a current peak value is greater than the minimum peak threshold value, which can be defined as the occurrence of current spark.

Figure 6:
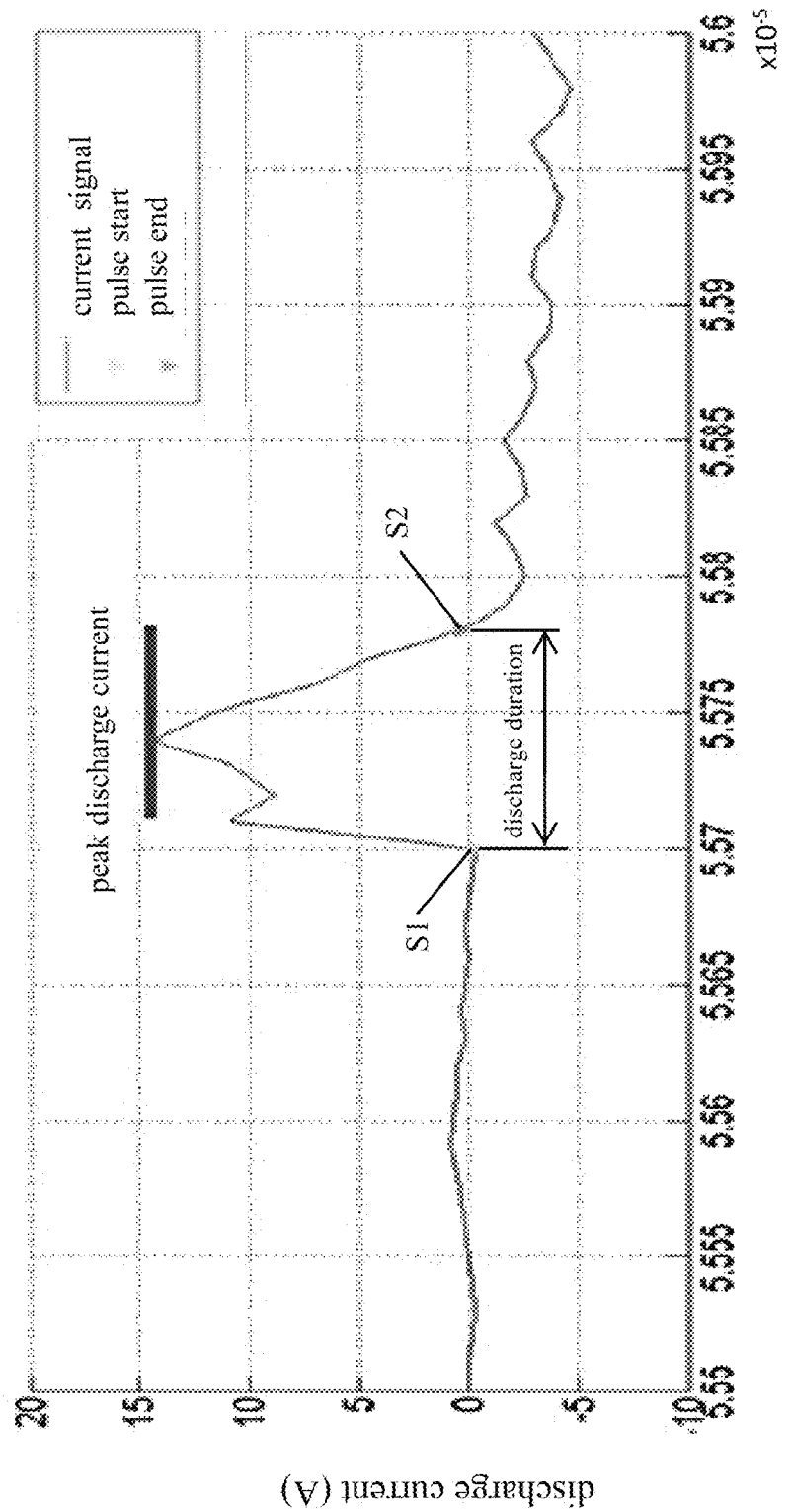
FIG. 6 is a schematic diagram showing a relationship between discharge current and time.

Referring to FIG. 6, FIG. 6 is a schematic diagram showing a relationship between discharge current and time. The discharge peak current is defined as a maximum current value passing through the electrode to the workpiece within the pulse duration. The average discharge peak current is defined as a mean value of the peak current within a duration of time (e.g. the duration between the pulse start and the pulse end as shown in FIG. 6). The standard deviation of peak current is calculated from the discharge peak current. As shown in FIG. 6, the discharge duration is defined as a duration from a start point S1 to an end point S2 of the discharge current waveform profile (e.g. the duration between the pulse start and the pulse end as shown in FIG. 6).

In the process features, the average delay time, the standard deviation of delay time, the short circuit ratio, the average short circuit time and the standard deviation of short circuit time are established based on the discharge voltage signals. Referring to FIG. 4, the average delay time is defined as a time (e.g. $t_d$ shown in FIG. 4) which elapses between the time when an open-circuit voltage is sufficiently high and the start time of the discharge current occurred.

Figure 7:
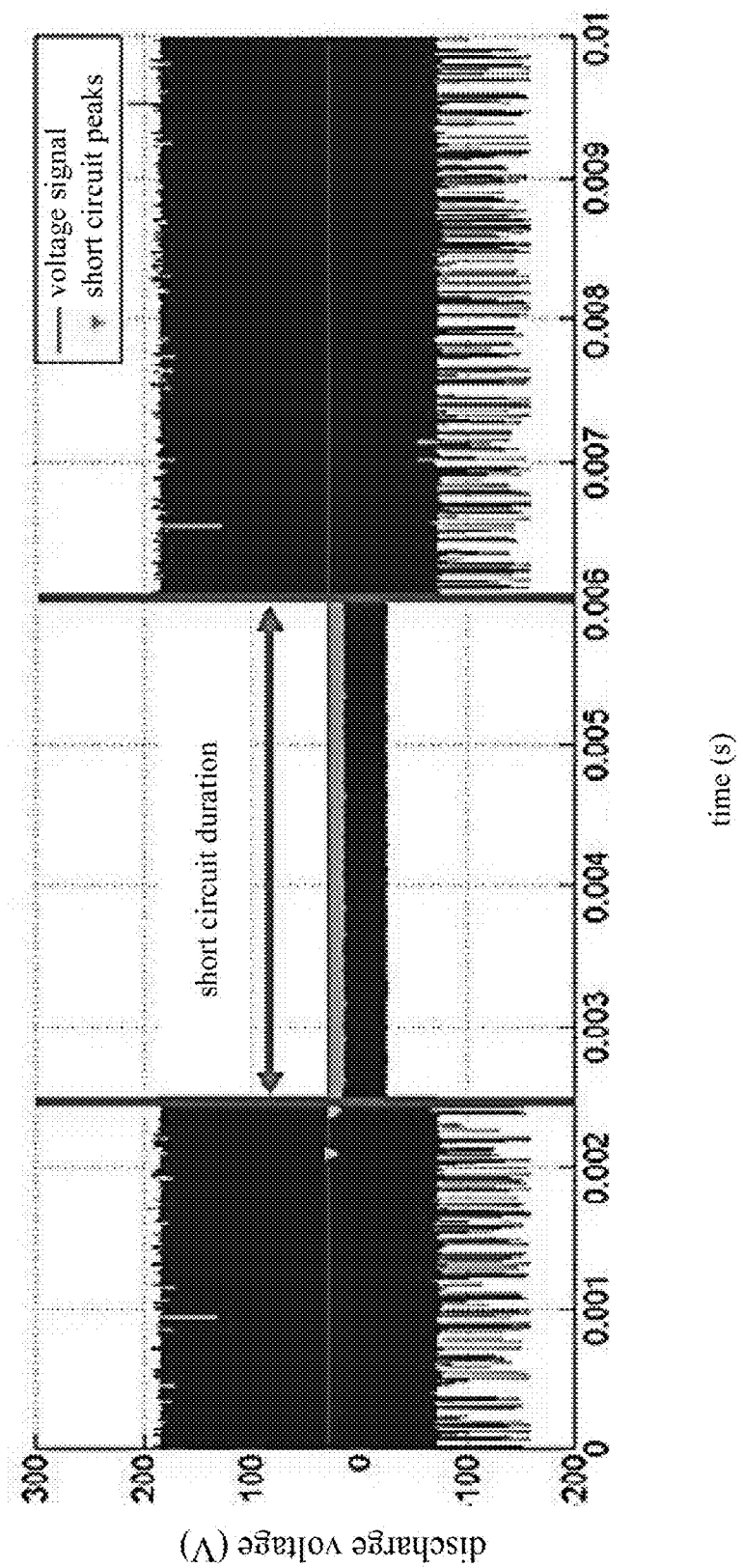
FIG. 7 is a schematic diagram showing a relationship between discharge current and time.

The short circuit ratio is defined as the number of short circuit pulse divided by the number of the discharge pulse. Referring to FIG. 7, FIG. 7 is a schematic diagram showing a relationship between discharge current and time. The short circuit pulse is defined as discharge pulse duration of an open-circuit voltage remains below a voltage threshold (e.g. line L2 shown in FIG. 4) in a discharge pulse cycle, such that the discharge pulse duration can be recorded as one short circuit pulse. As shown in FIG. 7, the average short circuit time and the standard deviation of short circuit time are related to a short circuit duration. The short circuit duration is defined as a duration in which multiple short circuits occur in a discharge pulse cycle (at least two pulses). The time of the short circuit duration can be calculated from a time which elapses between the first short circuit peak and the last short circuit.

Figure 8:
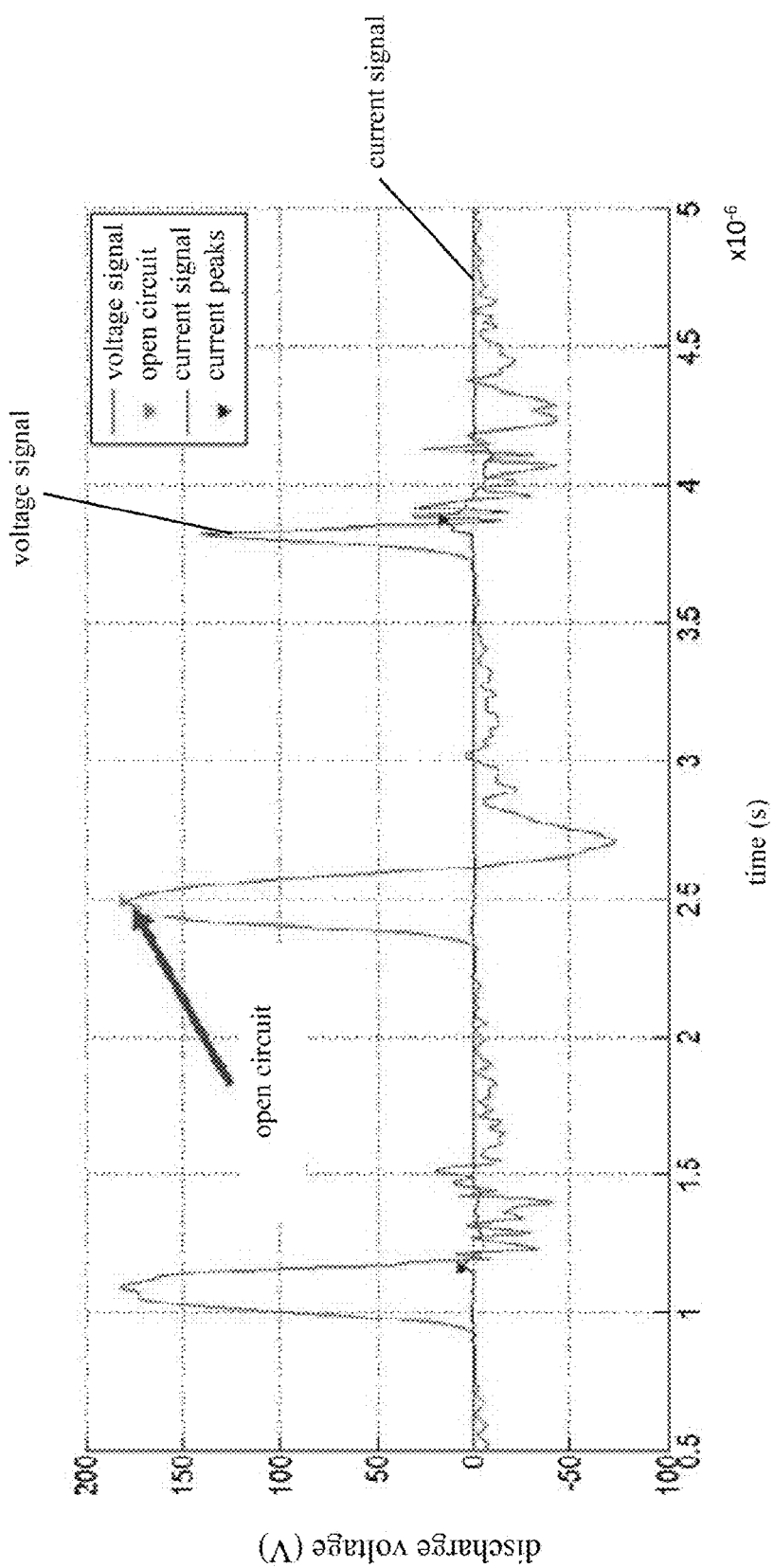
FIG. 8 is a schematic diagram showing relationships between time and discharge voltage/discharge current.
Figure 9A:
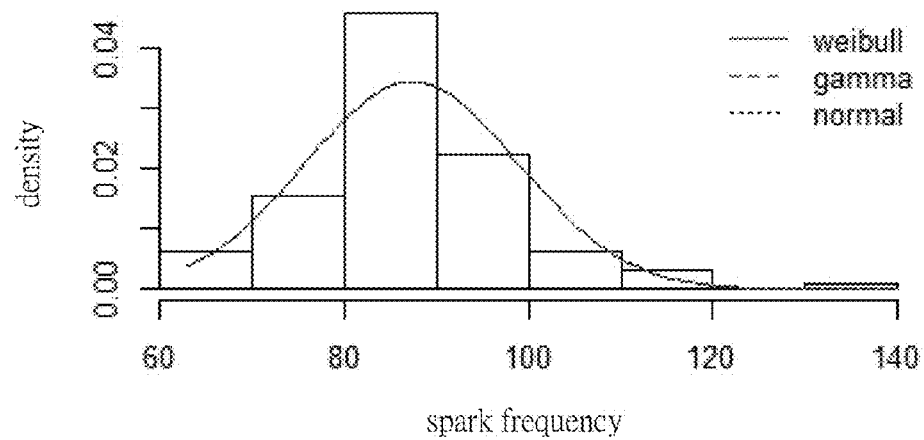
FIG. 9A-FIG. 9D are a Histogram, an empirical distribution, a Quantile-Quantile Plot and a Probability-Probability plot generated by performing distribution fitting to the sample data of spark frequency.
Figure 9B:
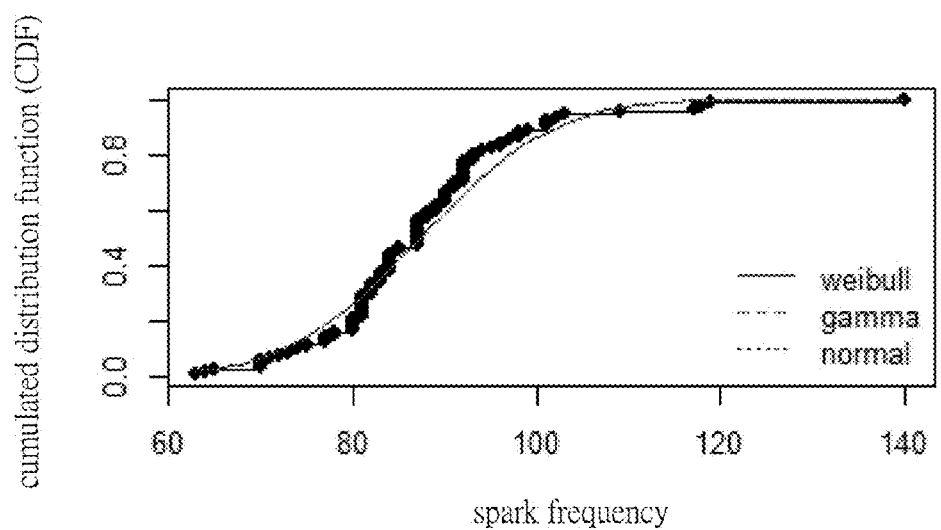
Figure 9C:
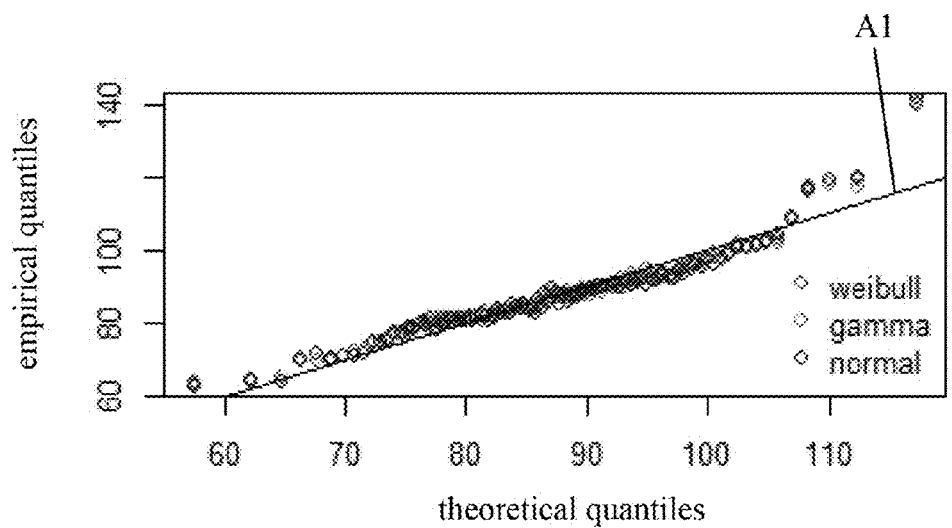
Figure 9D:
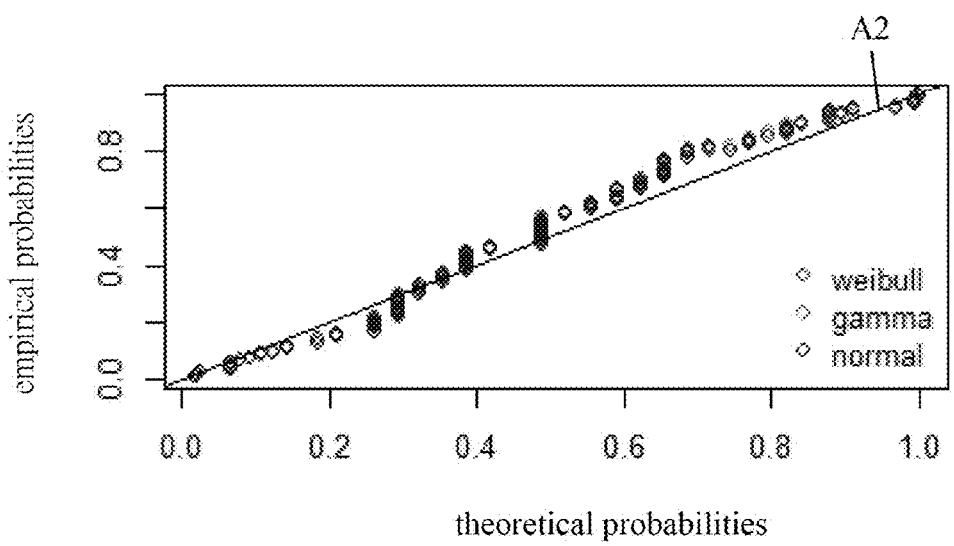
Figure 10A:
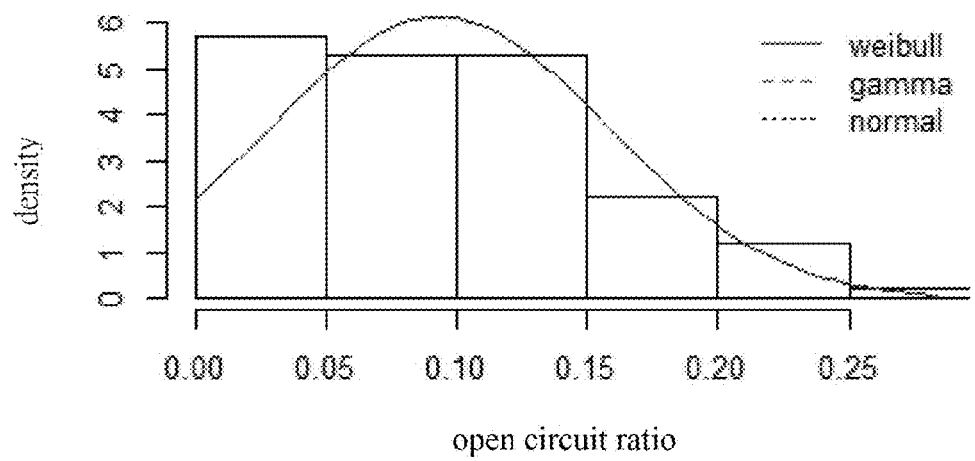
FIG. 10A-FIG. 10D are a Histogram, an empirical distribution, a Quantile-Quantile Plot and a Probability-Probability plot generated by performing distribution fitting to the sample data of open circuit ratio.
Figure 10B:
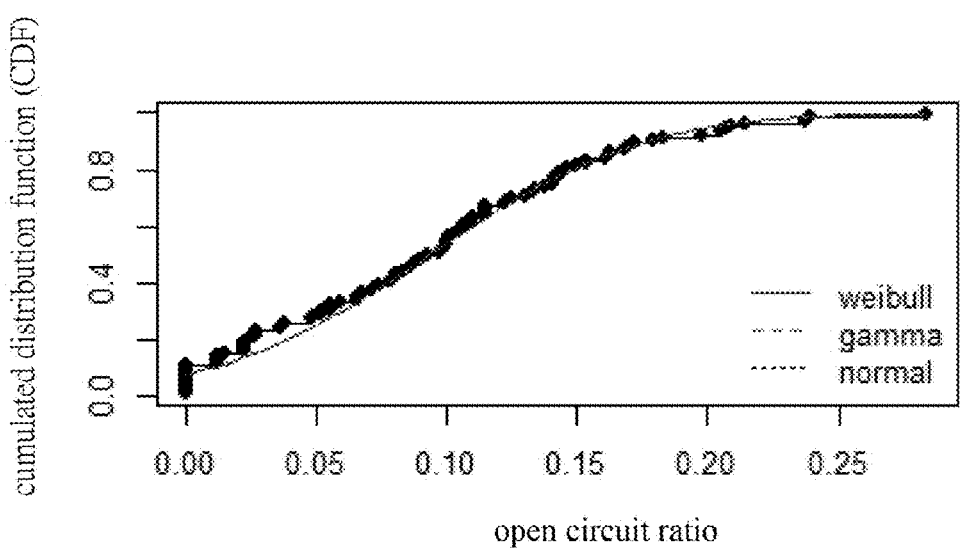
Figure 10C:
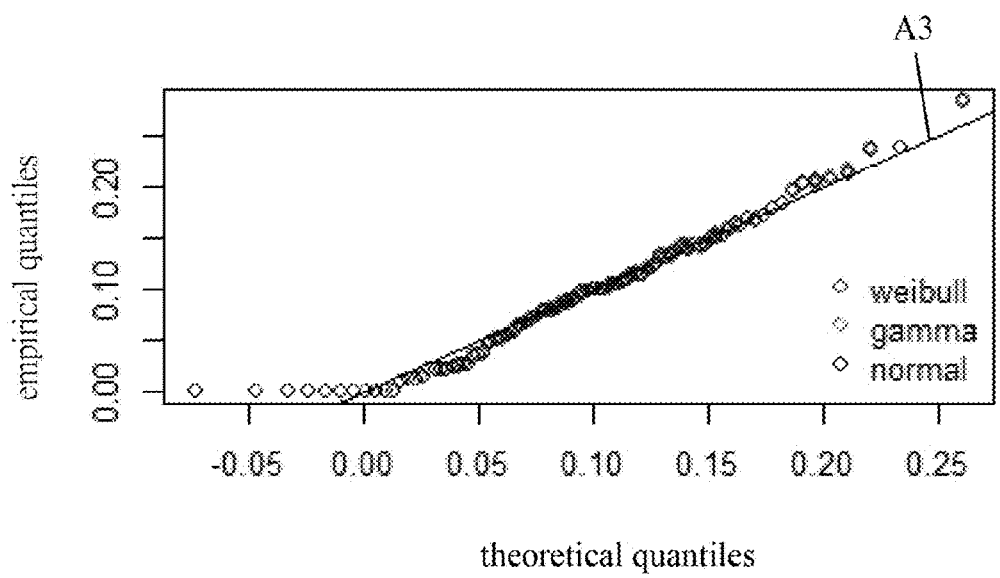
Figure 10D:
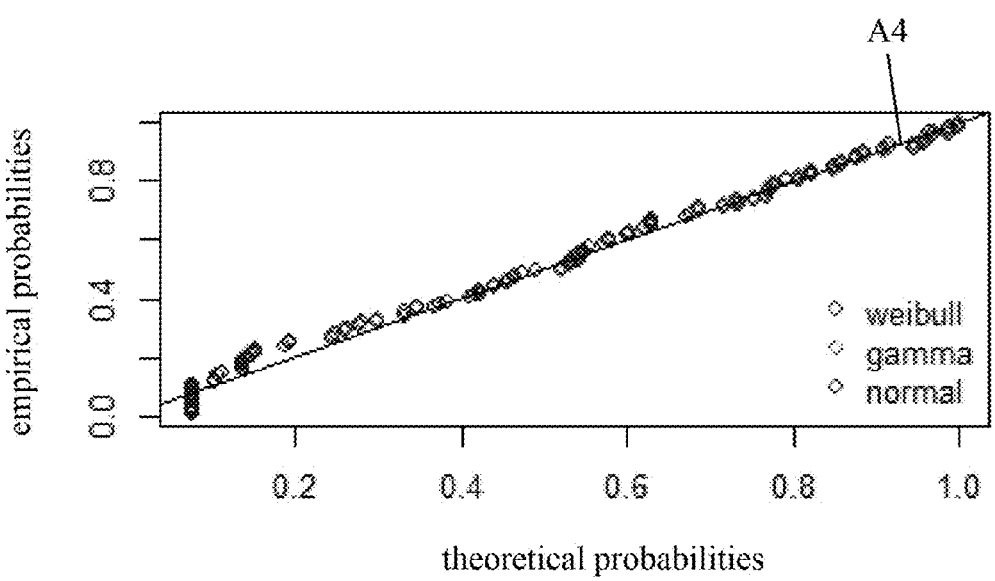
Figure 11A:
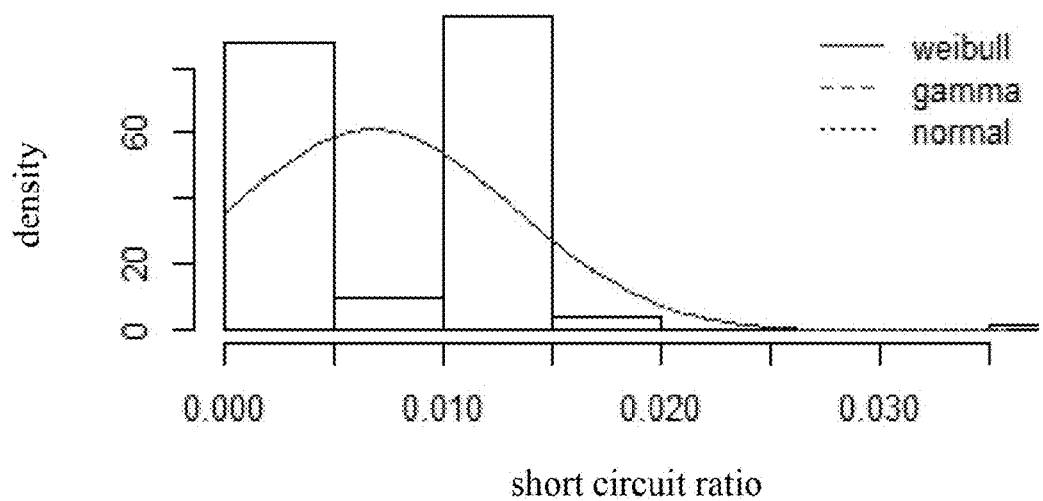
FIG. 11A-FIG. 11D are a Histogram, an empirical distribution, a Quantile-Quantile Plot and a Probability-Probability plot generated by performing distribution fitting to the sample data of short circuit ratio.
Figure 11B:
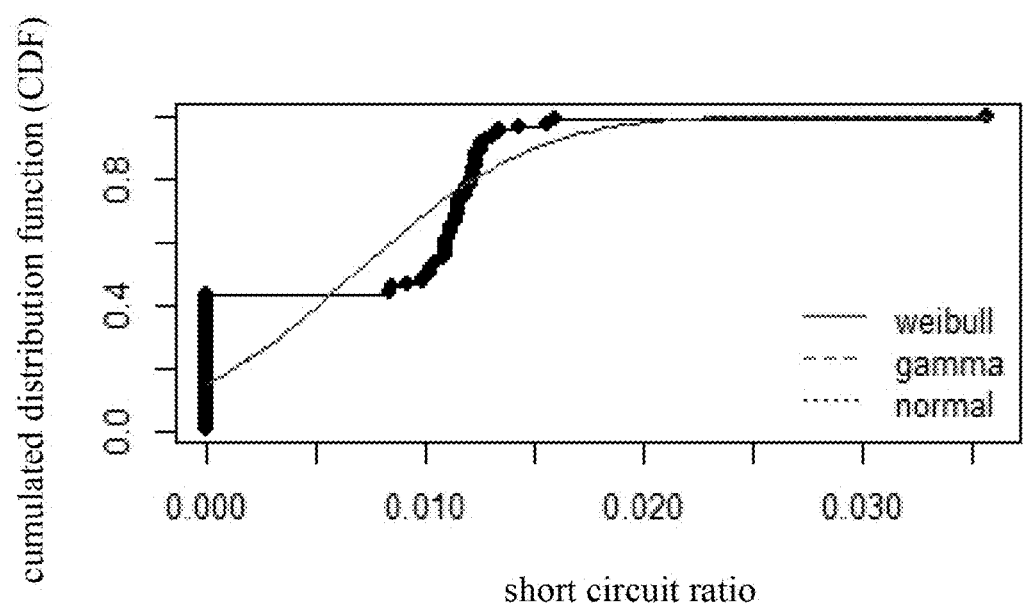
Figure 11C:
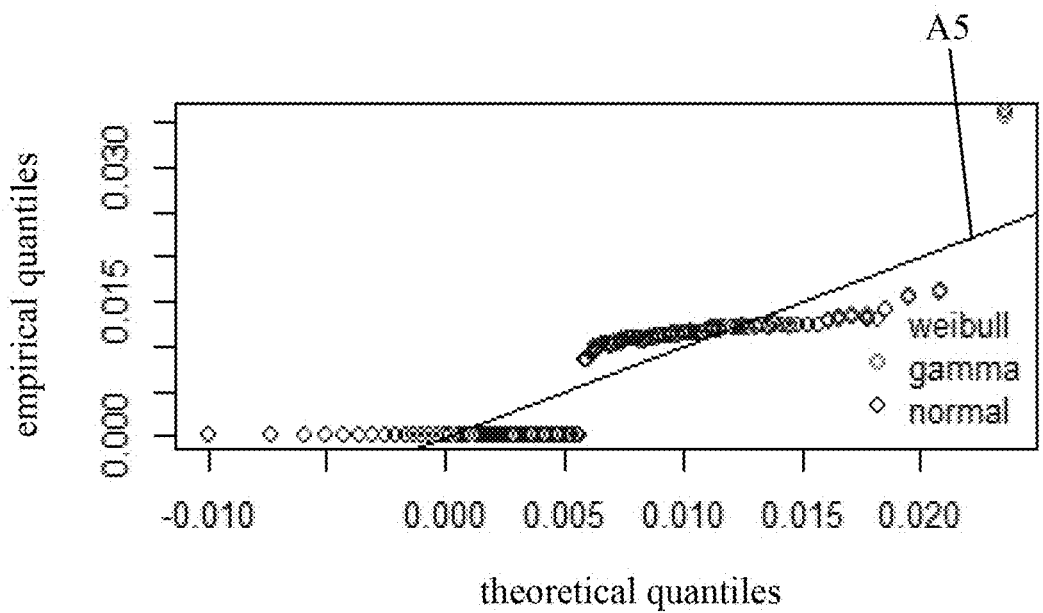
Figure 11D:
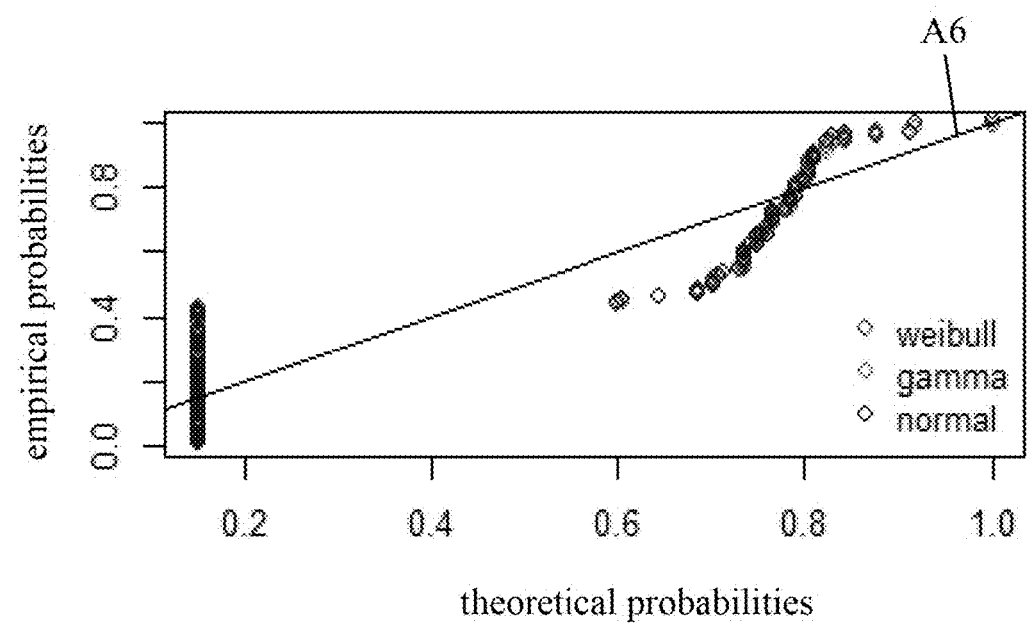
Figure 12A:
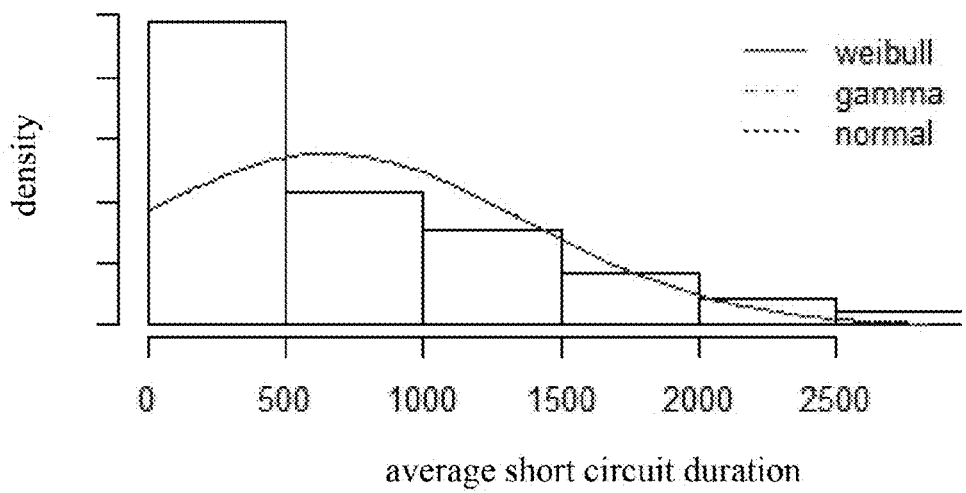
FIG. 12A-FIG. 12D are a Histogram, an empirical distribution, a Quantile-Quantile Plot and a Probability-Probability plot generated by performing distribution fitting to the sample data of average short circuit time.
Figure 12B:
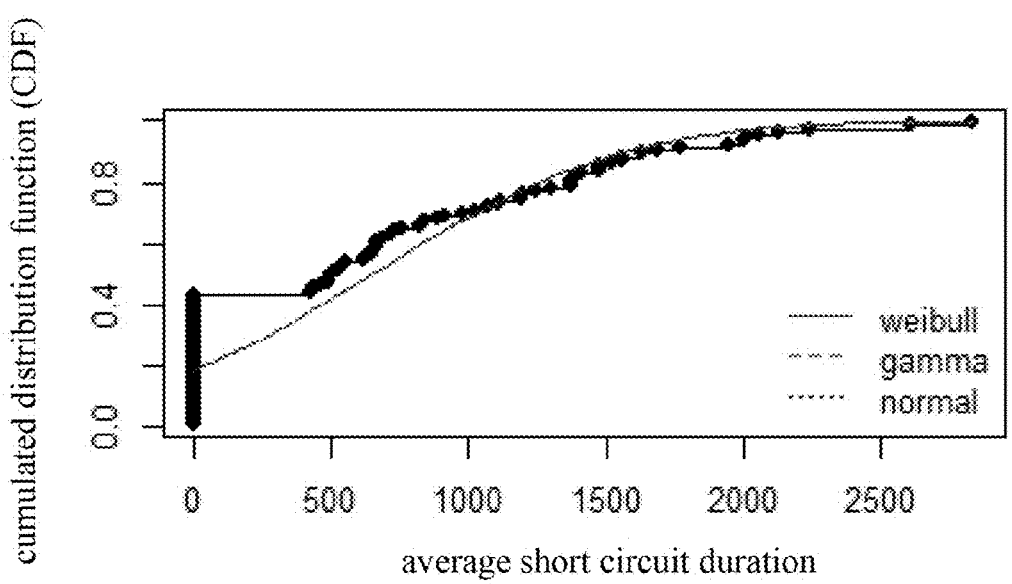
Figure 12C:
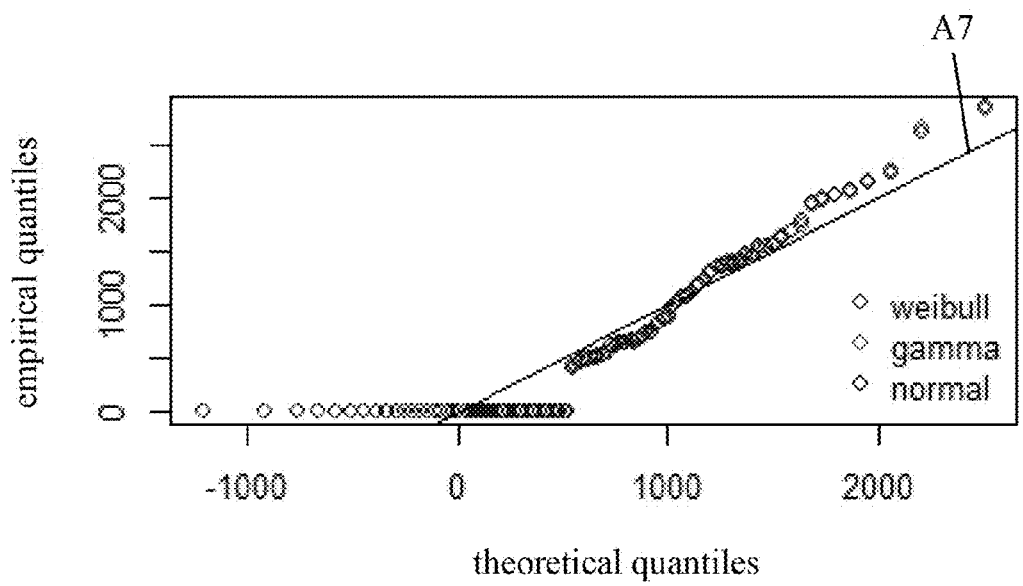
Figure 12D:
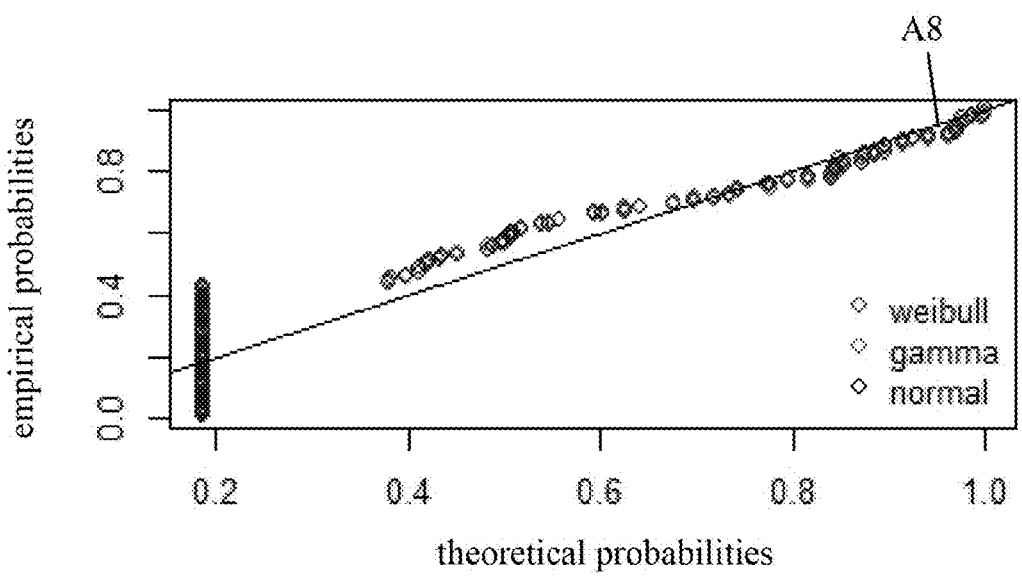
Figure 13A:
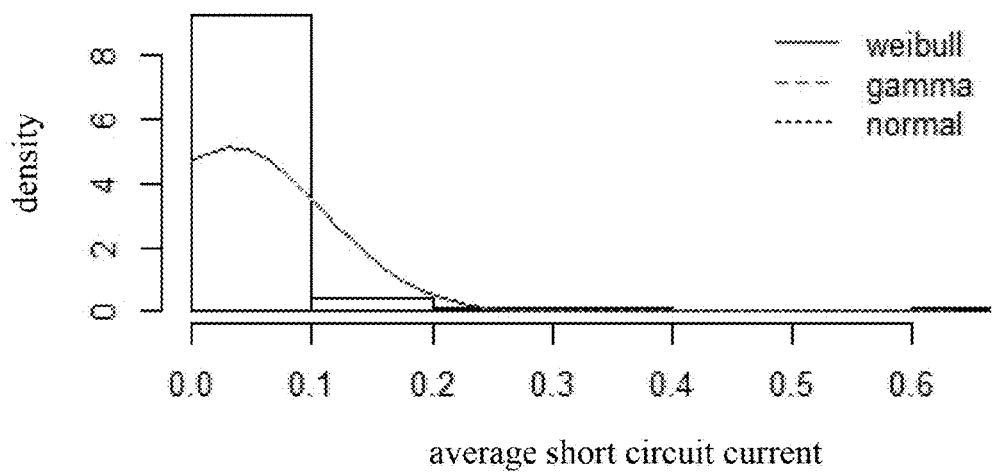
FIG. 13A-FIG. 13D are a Histogram, an empirical distribution, a Quantile-Quantile Plot and a Probability-Probability plot generated by performing distribution fitting to the sample data of average short circuit current.
Figure 13B:
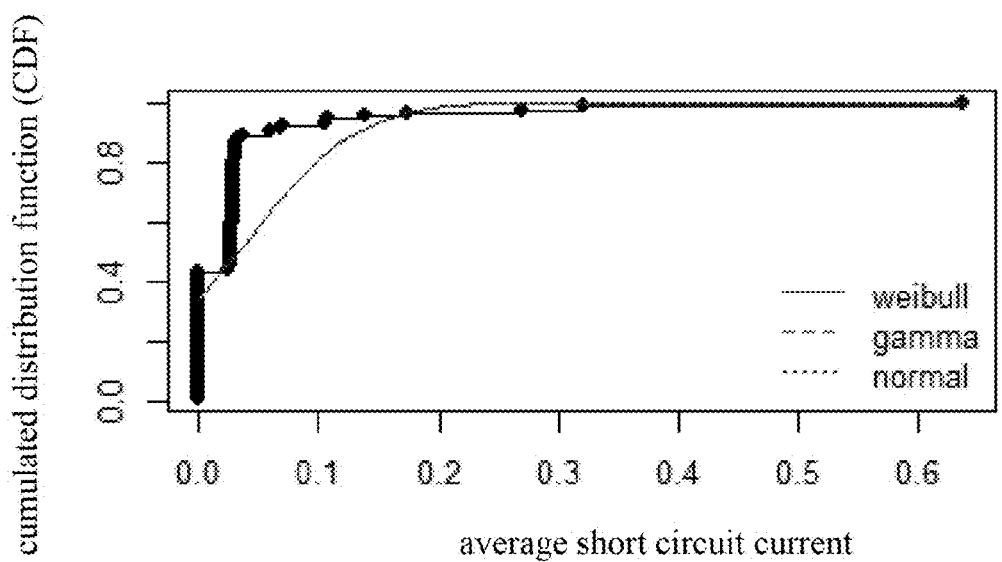
Figure 13C:
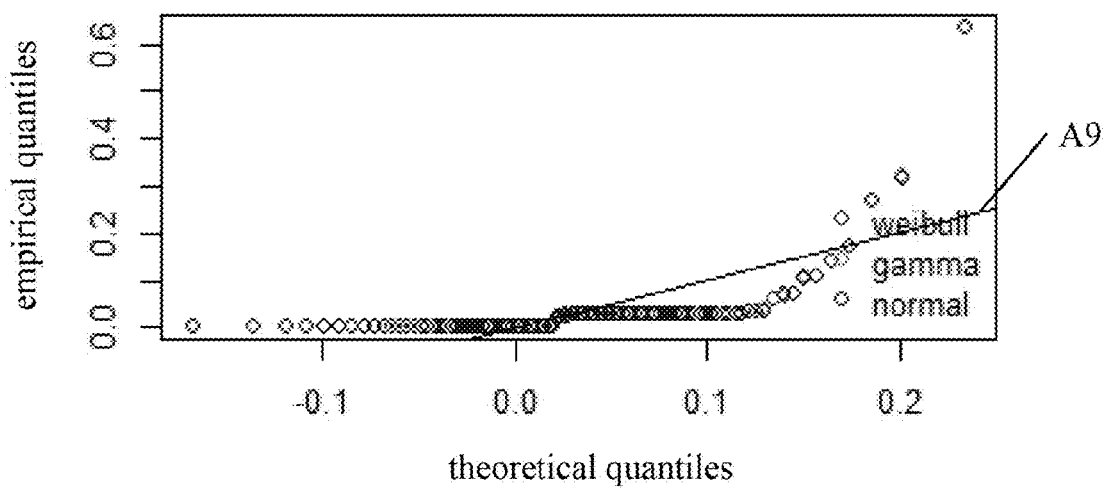
Figure 13D:
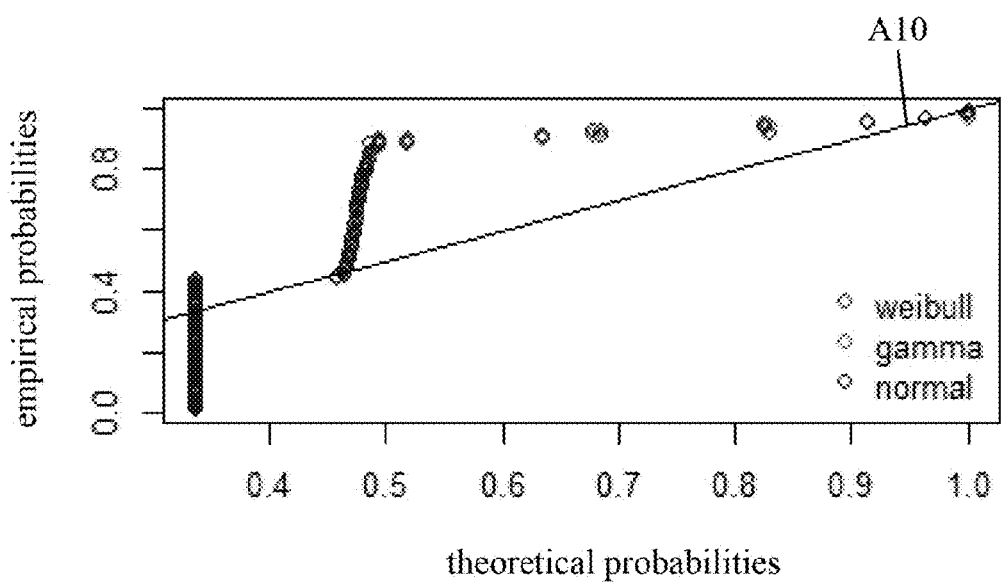
Figure 14A:
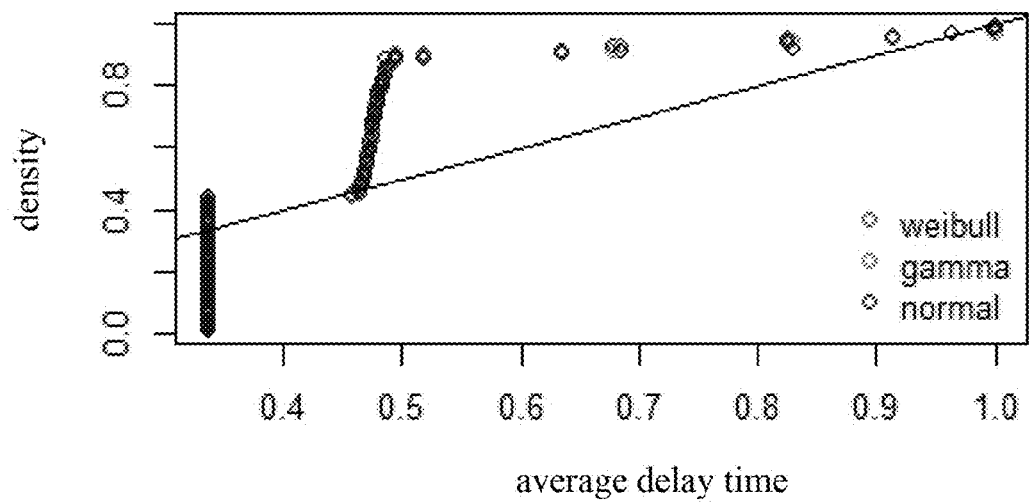
FIG. 14A-FIG. 14D are a Histogram, an empirical distribution, a Quantile-Quantile Plot and a Probability-Probability plot generated by performing distribution fitting to the sample data of average delay time.
Figure 14B:
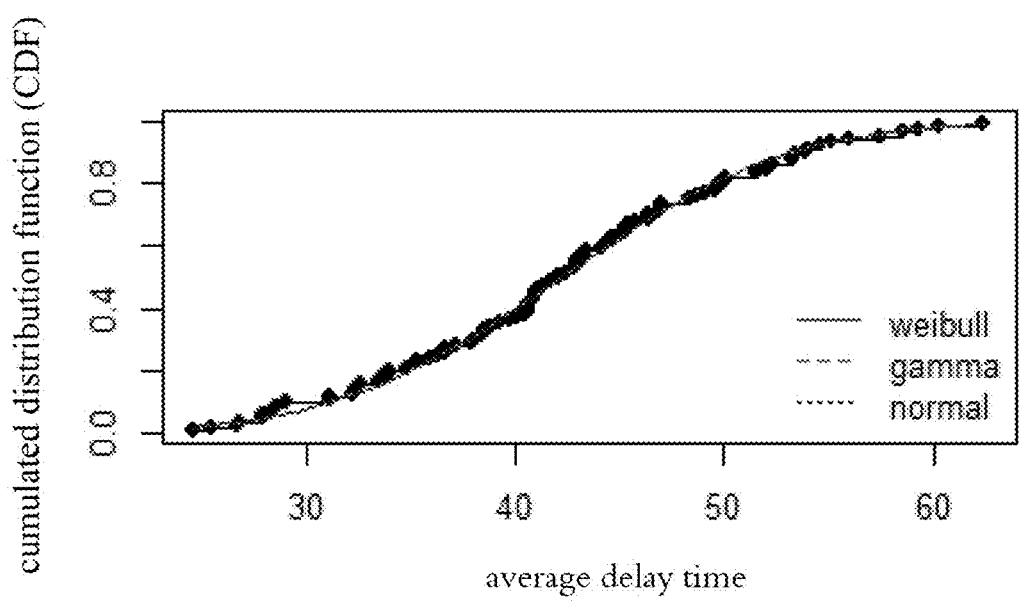
Figure 14C:
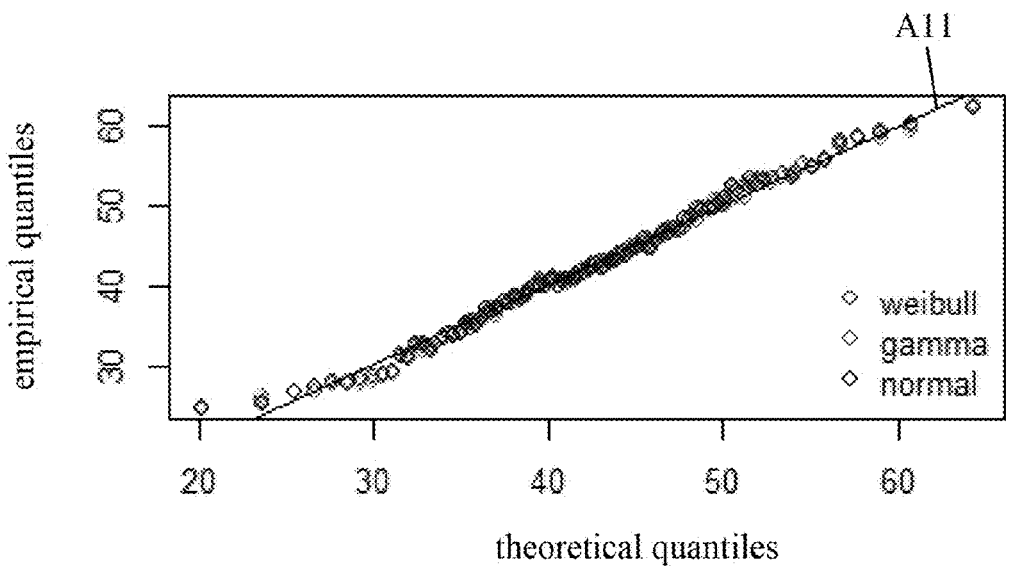
Figure 14D:
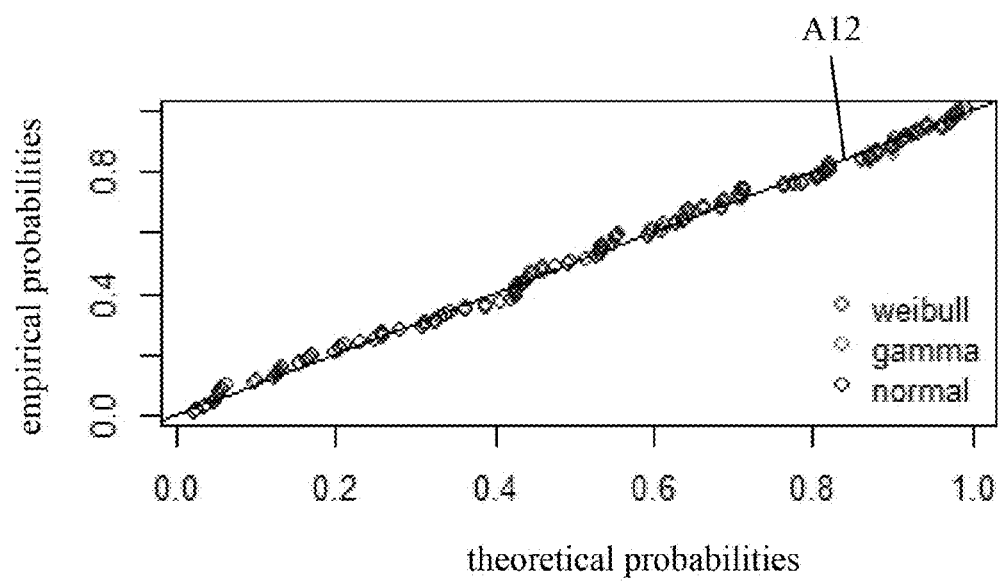
Figure 15A:
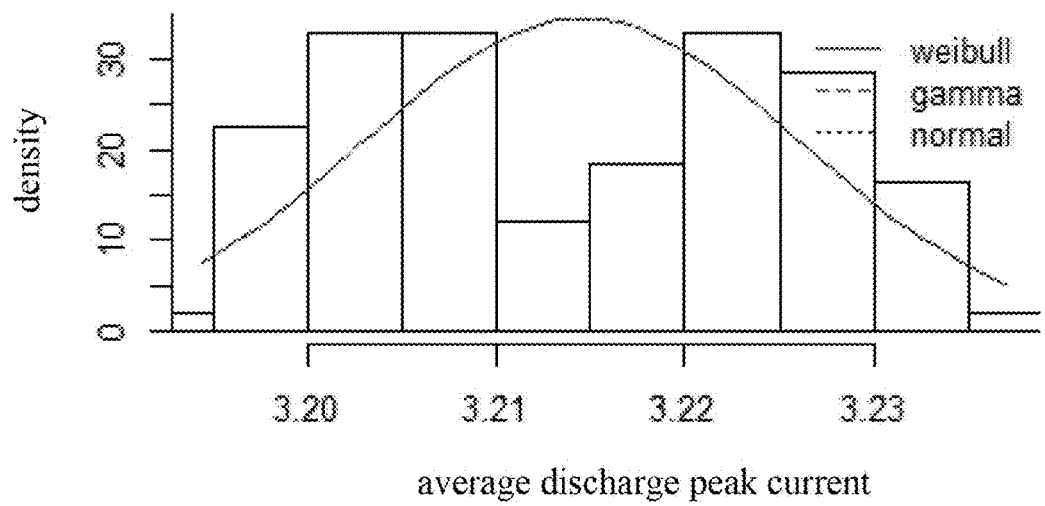
FIG. 15A-FIG. 15D are a Histogram, an empirical distribution, a Quantile-Quantile Plot and a Probability-Probability plot generated by performing distribution fitting to the sample data of average discharge peak current.
Figure 15B:
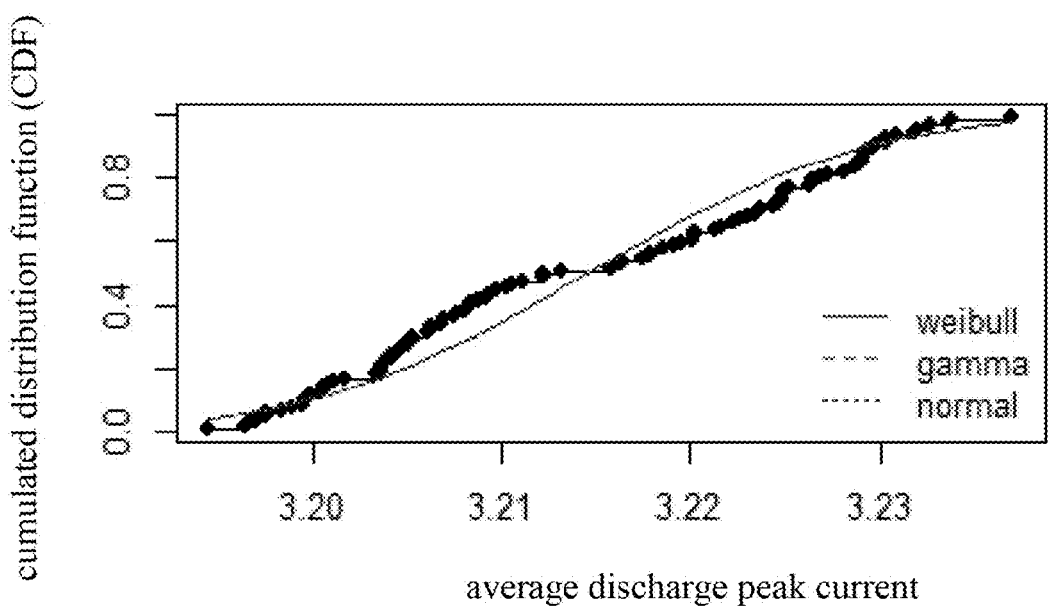
Figure 15C:
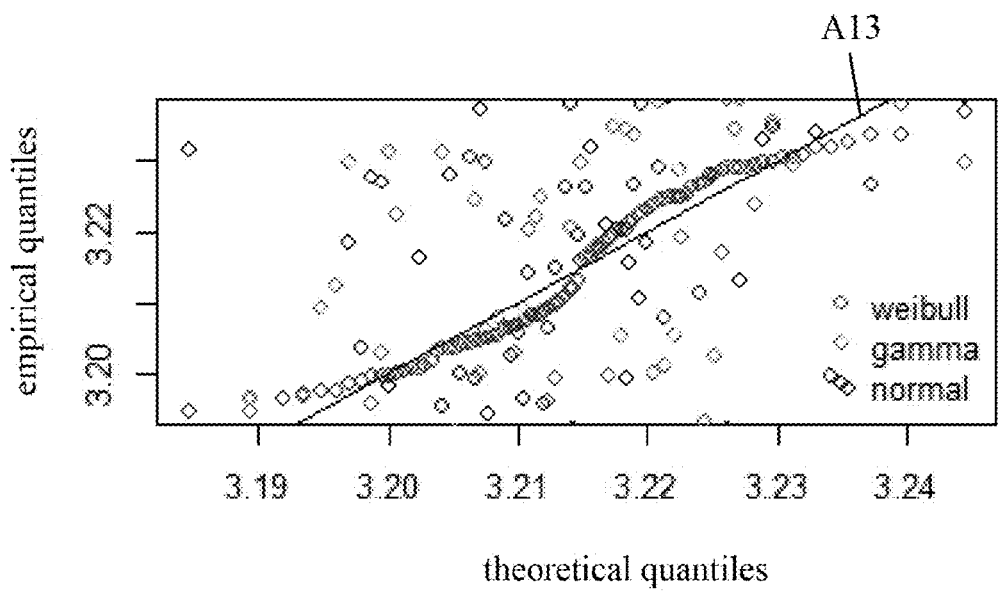
Figure 15D:
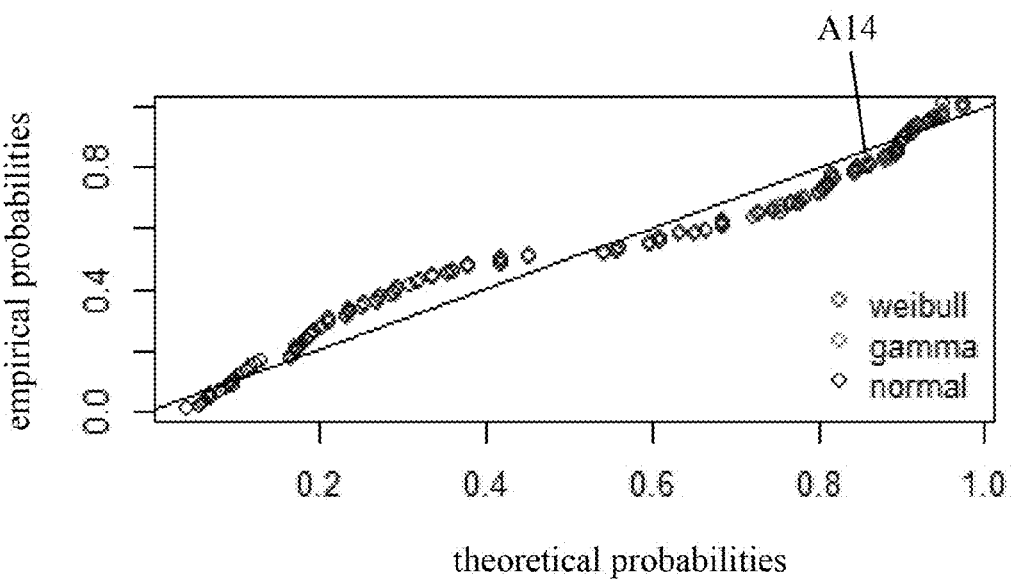
Figure 16A:
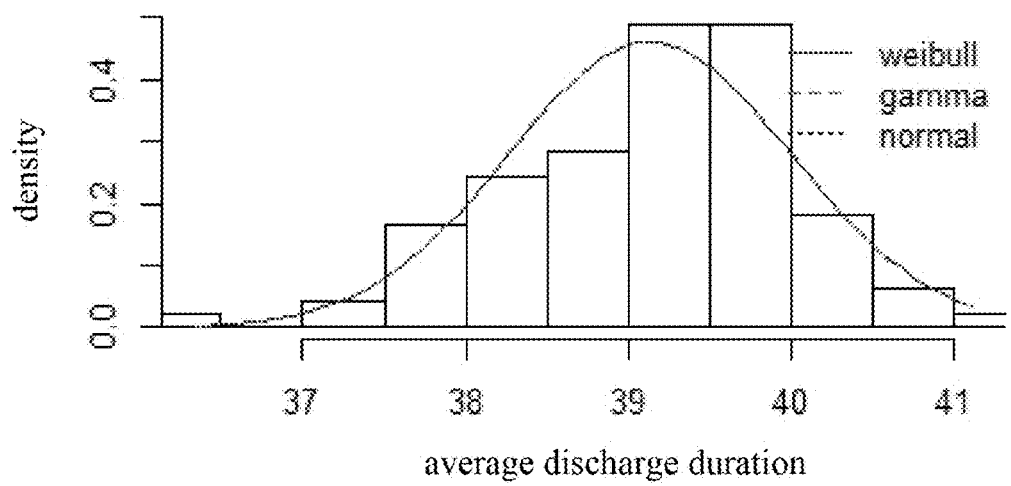
FIG. 16A-FIG. 16D are a Histogram, an empirical distribution, a Quantile-Quantile Plot and a Probability-Probability plot generated by performing distribution fitting to the sample data of average discharge duration.
Figure 16B:
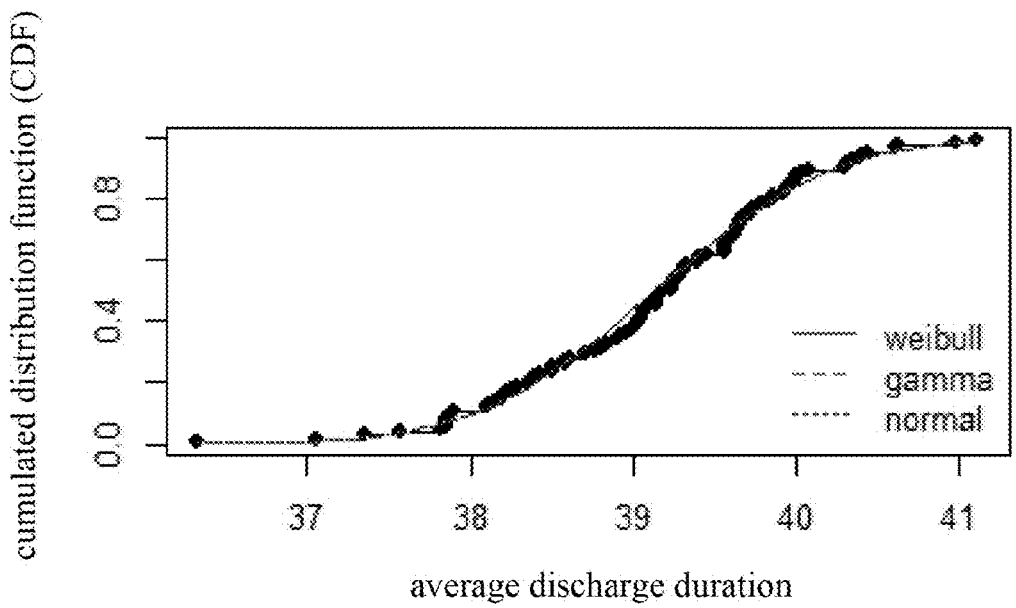
Figure 16C:
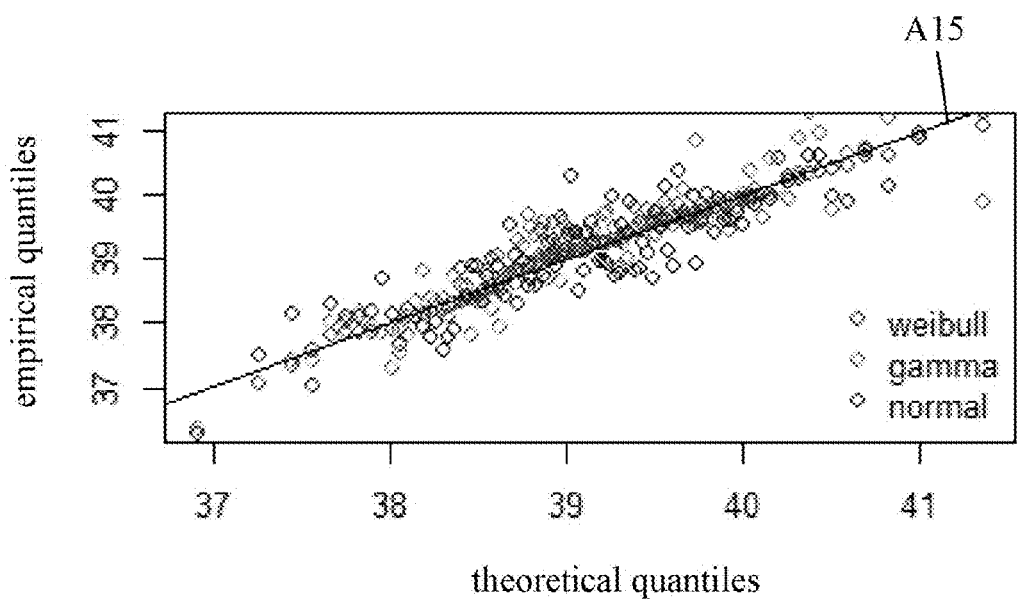
Figure 16D:
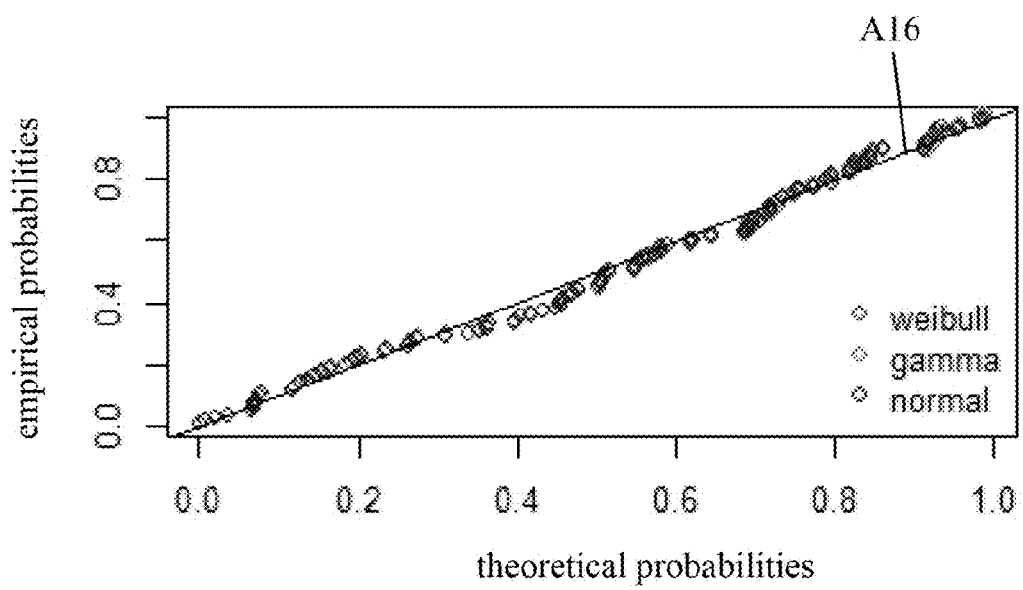
Figure 17A:
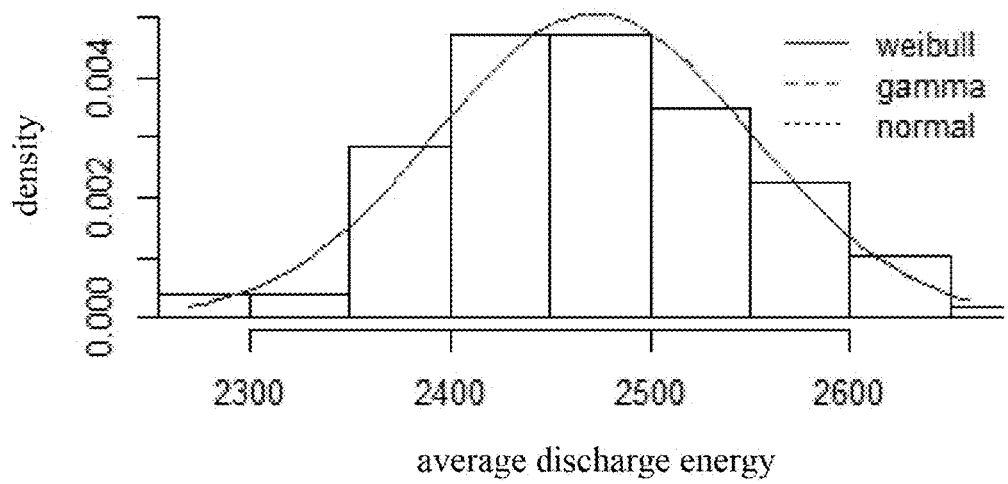
FIG. 17A-FIG. 17D are a Histogram, an empirical distribution, a Quantile-Quantile Plot and a Probability-Probability plot generated by performing distribution fitting to the sample data of average discharge energy.
Figure 17B:
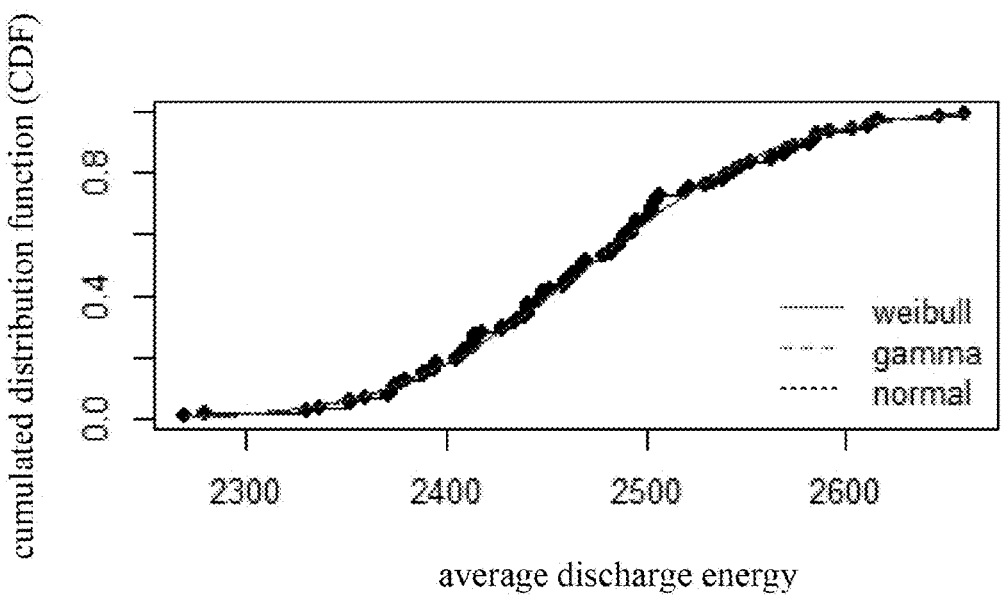
Figure 17C:
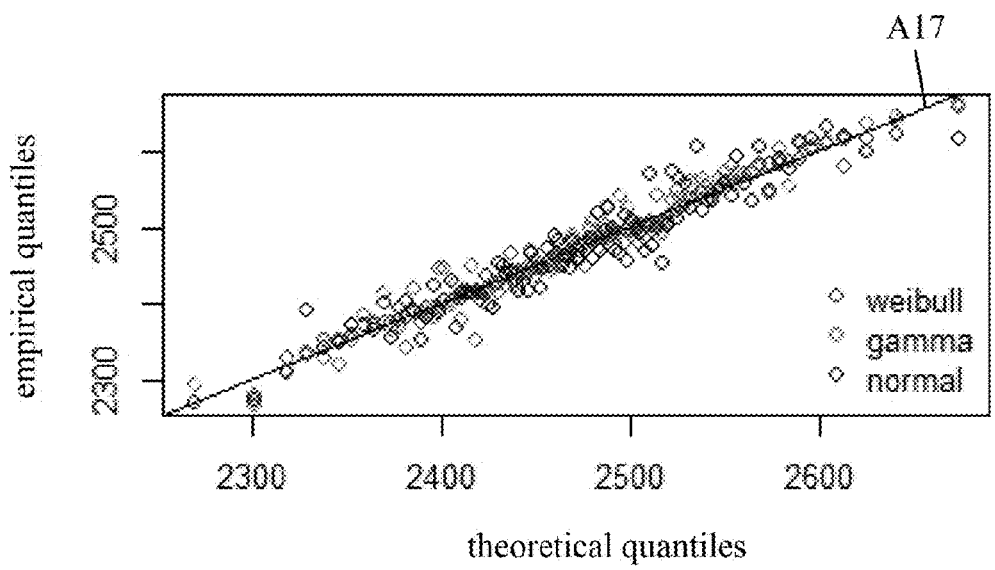
Figure 17D:
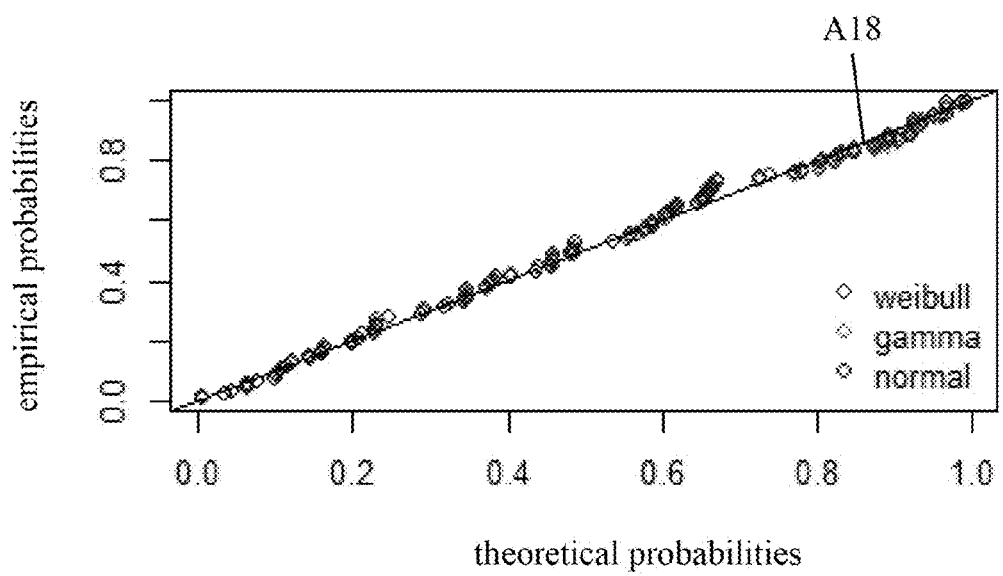

In the process features, the open circuit ratio, the average discharge energy, the standard deviation of discharge energy, the average short circuit current and the standard deviation of short circuit current are established from the discharge current signals and the discharge voltage signals. Referring to FIG. 8, FIG. 8 is a schematic diagram showing relationships between time and discharge voltage/discharge current. As shown in FIG. 8, the open circuit occurs when a voltage peak (ignition voltage) is not followed by a current peak (discharge current). The occurrence of the open circuit represents that the current peak is not induced by the ignition voltage, which can be defined as an invalid pulse. The open circuit ratio is defined as the number of the open circuits divided by the total number of discharge pulses.

The feature of the average discharge energy relates to the stability and quality of the electrical discharge machining process. The discharge energy $E_i$ of an $i^{th}$ discharge is obtained by equation (1):

$$E_i = \int_0^{t_{ei}} I_{pi} U_i dt \quad (1)$$

where $t_{ei}$ represents a duration of the $i^{th}$ discharge, $U_i$ represents a discharge voltage of the $i^{th}$ discharge, and $I_{pi}$ represents a peak current of the $i^{th}$ discharge.

The short circuit current is defined as an average of the maximum peak current (which exceeds the minimum threshold) and the minimum valley current (which is smaller than the minimum threshold) in a pulse duration. The average short circuit current defined as a mean value of all of the short circuit current in the duration of short circuit occurrence.

Referring to FIG. 1 and FIG. 2, after the process features are established, an operation 430 is performed to collect plural sets of sample data which correlate to the each of the process features during the operation of the electrical discharge machine 110. In the present embodiment, plural die steel workpiece samples with a length of 30 mm, a width of 30 mm and a height of 10 mm are used. An electrode with a diameter of 3 mm and discharge current condition of 4 A are applied to create plural openings with a depth of 100 um. A drilling process is performed by the electrical discharge machine to form an opening on each of the workpiece samples. In the drilling process, when the main shaft 111 is located at different feeding positions, the collecting unit 122 can collect plural different current and voltage signals, thereby obtaining plural sets of sample data which correlate to the each of the process features at different feeding positions. For examples, while the main shaft 111 is machining the workpiece samples P1, the processing unit 123 can obtain a set of sample data of the spark frequency, a set of sample data of the open circuit ratio, a set of sample data of the short circuit ratio, a set of sample data of the average short circuit time, a set of sample data of the average short circuit current, a set of sample data of the average delay time, a set of sample data of the standard deviation of delay time, a set of sample data of the average discharge peak current, a set of sample data of the standard deviation of peak current, a set of sample data of the average discharge duration, a set of sample data of the standard deviation of average discharge duration, a set of sample data of the average discharge energy and a set of sample data of the standard deviation of discharge energy.

After obtaining plural sets of sample data which correlate to the each of the process features, an operation 440 is performed to apply distribution fitting to each of the sets of the sample by using a probability fitting method, so as to determine whether an mean value and a standard deviation of each set of the sample data represent each of the process features, thereby obtaining a determination result. In some embodiments, a normal distribution method, a Weibull distribution method, or a Gamma distribution method may be used to perform distribution fitting to each of the sets of the sample to determine whether the set of sample data fits a normal distribution. In some examples, a Probability-Probability plot (P-P plot) and a Quantile-Quantile Plot (Q-Q plot) are used to analysis whether the distribution of the sample data fits an ideal distribution curve. If the determination result is yes, meaning that the mean value and the standard deviation of the set of the sample data can be used to represent a corresponding process feature. Therefore, the distribution fitting is used to select appropriate repressive process features from each of the sets of the sample data. Moreover, the distribution fitting may also be used to validate the reliability of using the mean value and the standard deviation of the set of the sample data to represent the process feature corresponding to the set of the sample data. On the contrary, If the determination result is no, meaning that a correlation analysis step can be omitted thereafter, but the present invention is not limited thereto.

Referring to FIG. 9A-FIG. 9D, FIG. 9A-FIG. 9D are a Histogram, an empirical distribution, a Quantile-Quantile Plot and a Probability-Probability plot generated by performing distribution fitting to the sample data of spark frequency. Line A1 in the Q-Q plot and line A2 in the P-P plot represent ideal lines, in which each of the ideal lines represents that the distribution of the sample data of the spark frequency fits a normal distribution in an ideal situation. Blue circles, red circles and green circles in the Q-Q plot and the P-P respectively indicate the distributions of the sample data of the spark frequency generated by normal distribution analysis, Weibull distribution analysis and Gamma distribution analysis. As shown in FIG. 9A-FIG. 9D, the sample data of the spark frequency about fall on the ideal curve, meaning that the distribution of the sample data of the spark frequency fits the normal distribution. Therefore, the mean value and the standard deviation of the sample data of the spark frequency can be used to represent the overall process feature of the spark frequency.

Referring to FIG. 10A-FIG. 10D, FIG. 10A-FIG. 10D are a Histogram, an empirical distribution, a Quantile-Quantile Plot and a Probability-Probability plot generated by performing distribution fitting to the sample data of open circuit ratio. Line A3 in the Q-Q plot and Line A4 in the P-P plot represent ideal lines, in which each of the ideal lines represents that the distribution of the sample data of the open circuit ratio fits the normal distribution in an ideal situation. Blue circles, red circles and green circles in the Q-Q plot and the P-P respectively indicate the distributions of the sample data of the open circuit ratio generated by normal distribution analysis, Weibull distribution analysis and Gamma distribution analysis. As shown in FIG. 10A-FIG. 10D, the sample data of the open circuit ratio about fall on the ideal curve, meaning that the distribution of the sample data of the open circuit ratio fits the normal distribution. Therefore, the mean value and the standard deviation of the sample data of the open circuit ratio can be used to represent the overall process feature of the open circuit ratio.

Referring to FIG. 11A-FIG. 11D, FIG. 11A-FIG. 11D are a Histogram, an empirical distribution, a Quantile-Quantile Plot and a Probability-Probability plot generated by performing distribution fitting to the sample data of short circuit ratio. Line A5 in the Q-Q plot and Line A6 in the P-P plot represent ideal lines, in which each of t the ideal lines represents that the distribution of the sample data of the short circuit ratio fits the normal distribution in an ideal situation. Blue circles, red circles and green circles in the Q-Q plot and the P-P respectively indicate the distributions of the sample data of the short circuit ratio generated by normal distribution analysis, Weibull distribution analysis and Gamma distribution analysis. As shown in FIG. 11A-FIG. 11D, the sample data of the short circuit ratio do not fall on the ideal curve, meaning that the distribution of the sample data of the short circuit ratio does not fit the normal distribution. Therefore, the mean value and the standard deviation of the sample data of the open circuit ratio cannot be used to represent the overall process feature of the short circuit ratio.

Referring to FIG. 12A-FIG. 12D, FIG. 12A-FIG. 12D are a Histogram, an empirical distribution, a Quantile-Quantile Plot and a Probability-Probability plot generated by performing distribution fitting to the sample data of average short circuit time. Line A7 in the Q-Q plot and Line A8 in the P-P plot represent ideal lines, in which each of the ideal lines represents that the distribution of the sample data of the average short circuit time fits the normal distribution in an ideal situation. Blue circles, red circles and green circles in the Q-Q plot and the P-P respectively indicate the distributions of the sample data of the average short circuit time generated by normal distribution analysis, Weibull distribution analysis and Gamma distribution analysis. As shown in FIG. 12A-FIG. 12D, the sample data of the open circuit ratio about fall on the ideal curve, meaning that the distribution of the sample data of the average short circuit time fits the normal distribution. Therefore, the mean value and the standard deviation of the sample data of the average short circuit time can be used to represent the overall process feature of the average short circuit time.

Referring to FIG. 13A-FIG. 13D, FIG. 13A-FIG. 13D are a Histogram, an empirical distribution, a Quantile-Quantile Plot and a Probability-Probability plot generated by performing distribution fitting to the sample data of average short circuit current. Line A9 in the Q-Q plot and Line A10 in the P-P plot represent ideal lines, in which each of the ideal lines represents that the distribution of the sample data of the average short circuit current fits the normal distribution in an ideal situation. Blue circles, red circles and green circles in the Q-Q plot and the P-P respectively indicate the distributions of the sample data of the average short circuit current generated by normal distribution analysis, Weibull distribution analysis and Gamma distribution analysis. As shown in FIG. 13A-FIG. 13D, the sample data of the average short circuit current do not fall on the ideal curve, meaning that the distribution of the sample data of the average short circuit current does not fit the normal distribution. Therefore, the mean value and the standard deviation of the sample data of the average short circuit current cannot be used to represent the overall process feature of the average short circuit current.

Referring to FIG. 14A-FIG. 14D, FIG. 14A-FIG. 14D are a Histogram, an empirical distribution, a Quantile-Quantile Plot and a Probability-Probability plot generated by performing distribution fitting to the sample data of average delay time. Line A11 in the Q-Q plot and Line A12 in the P-P plot represent ideal lines, in which each of the ideal lines represents that the distribution of the sample data of the average delay time fits the normal distribution in an ideal situation. Blue circles, red circles and green circles in the Q-Q plot and the P-P respectively indicate the distributions of the sample data of the average delay time generated by normal distribution analysis, Weibull distribution analysis and Gamma distribution analysis. As shown in FIG. 14A-FIG. 14D, the sample data of the average delay time about fall on the ideal curve, meaning that the distribution of the sample data of the average delay time fits the normal distribution. Therefore, the mean value and the standard deviation of the sample data of the average delay time can be used to represent the overall process feature of the average delay time.

Referring to FIG. 15A-FIG. 15D, FIG. 15A-FIG. 15D are a Histogram, an empirical distribution, a Quantile-Quantile Plot and a Probability-Probability plot generated by performing distribution fitting to the sample data of average discharge peak current. Line A13 in the Q-Q plot and Line A14 in the P-P plot represent ideal lines, in which each of the ideal lines represents that the distribution of the sample data of the average discharge peak current fits the normal distribution in an ideal situation. Blue circles, red circles and green circles in the Q-Q plot and the P-P respectively indicate the distributions of the sample data of the average discharge peak current generated by normal distribution analysis, Weibull distribution analysis and Gamma distribution analysis. As shown in FIG. 15A-FIG. 15D, the distribution of sample data of the average discharge peak current generated from the Weibull distribution about fall on the ideal curve. Therefore, the mean value and the standard deviation of the sample data of the average discharge peak current can be used to represent the overall process feature of the average discharge peak current.

Referring to FIG. 16A-FIG. 16D, FIG. 16A-FIG. 16D are a Histogram, an empirical distribution, a Quantile-Quantile Plot and a Probability-Probability plot generated by performing distribution fitting to the sample data of average discharge duration. Line A15 in the Q-Q plot and Line A16 in the P-P plot represent ideal lines, in which each of the ideal lines represents that the distribution of the sample data of the average discharge duration fits the normal distribution in an ideal situation. Blue circles, red circles and green circles in the Q-Q plot and the P-P respectively indicate the distributions of the sample data of the average discharge duration generated by normal distribution analysis, Weibull distribution analysis and Gamma distribution analysis. As shown in FIG. 16A-FIG. 16D, the sample data of the average discharge duration falls on the ideal curve, meaning that the distribution of the sample data of the average discharge duration about fit the normal distribution. Therefore, the mean value and the standard deviation of the sample data of the average discharge duration can be used to represent the overall process feature of the average discharge duration.

Referring to FIG. 17A-FIG. 17D, FIG. 17A-FIG. 17D are a Histogram, an empirical distribution, a Quantile-Quantile Plot and a Probability-Probability plot generated by performing distribution fitting to the sample data of average discharge energy. Line A17 in the Q-Q plot and Line A18 in the P-P plot represent ideal lines, in which each of t the ideal lines represents that the distribution of the sample data of the average discharge energy fits the normal distribution in an ideal situation. Blue circles, red circles and green circles in the Q-Q plot and the P-P respectively indicate the distributions of the sample data of the average discharge energy generated by normal distribution analysis, Weibull distribution analysis and Gamma distribution analysis. As shown in FIG. 17A-FIG. 17D, the sample data of the average discharge energy about fall on the ideal curve, meaning that the distribution of the sample data of the average discharge energy fits the normal distribution. Therefore, the mean value and the standard deviation of the sample data of the average discharge energy can be used to represent the overall process feature of the average discharge energy.

After obtaining the representatives of each of the process features, an operation 450 is performed to measure each of the workpiece samples with respect to each of at least one measurement item by using at least one metrology tool, thereby obtaining plural measurement values of the workpiece samples with respect to each of the at least one measurement item, in which each of the measurement values is an actual measurement value of one of the workpiece samples after the one of the workpiece samples is processed by the electrical discharge machine according to its corresponding set of process data. The present embodiment takes the drilling process as example, the drilling process is performed by using the electrode to form an opening on each of workpiece samples, and each of the openings has a top opening and a bottom opening respectively located on a top surface and a bottom surface of each of the workpiece samples. The measurement item can be a roughness of a bottom surface of the opening, a circularity of the top opening, a diameter of the top opening, a circularity of the bottom opening and/or a diameter of the bottom opening. Each of the measurement items has corresponding measurement values.

After obtaining the measurement values corresponding to each of the measurement items, an operation 460 is performed to perform a correlation analysis operation to obtain a plurality of correlation coefficients between the process features of the workpiece samples and the measurement values of the workpiece samples with respect to each of the at least one measurement item. In one embodiment, an equation (2) below is applied to MATLAB system to determine the relationship between the correlation between the process features of the workpiece samples and the measurement values with respect to each of the at least one measurement item.

$$\gamma = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}} \quad (2)$$

where i represents the $i_{th}$ workpiece sample, X represents each of the process features, and Y represents measurement values of each of the measurement items.

After obtaining the correlation coefficients between the process features of the workpiece samples and the measurement values of the workpiece samples with respect to each of the measurement items, an operation 470 is performed to select at least one key feature from the process features as representative according to the correlation coefficients between the process features and the measurement values of each of the measurement items. In one embodiment, when the measurement values are actual measurement values of roughness measured from the bottom surface of the openings on the workpiece samples, the process features with correlation coefficients greater than 0.2 or smaller than –0.2 are listed in the Table 1. Therefore, process features in Table 1 with top five absolute values of correlation coefficients are selected to be used as the key features related to the roughness (measurement item), such as the mean value of average short circuit current, the standard deviation of average short circuit current, the mean value of average delay time, the standard deviation of average delay time and the standard deviation of the average discharge energy.

TABLE 1 correlation coefficients between roughness and the process features

| mean value of spark frequency (−0.25) | standard deviation of spark frequency (−0.302) | mean value of open circuit ratio (−0.216) |
| mean value of short circuit time (0.287) | mean value of average short circuit current (−0.385) | standard deviation of average short circuit current (−0.355) |
| mean value of average delay time (−0.349) | standard deviation of average delay time (−0.395) | mean value of average discharge peak current (0.272) |
| standard deviation of average discharge peak current (−0.318) | standard deviation of average discharge duration (−0.219) | standard deviation of average discharge energy (−0.319) |

In other embodiments, when the measurement values are actual measurement values of circularities measured from the bottom opening on the workpiece samples, the process features with correlation coefficients greater than 0.2 or smaller than –0.2 are listed in the Table 2. Therefore, process features in Table 2 with top five absolute values of correlation coefficients are selected to be used as the key features related to the circularity of the bottom opening (measurement item), such as the mean value of spark frequency, the standard deviation of spark frequency, the mean value of short circuit ratio, the standard deviation of short circuit ratio and the mean value of average discharge duration.

TABLE 2 correlation coefficients between circularities of the bottom openings and the process features

| mean value of spark frequency (−0.31) | standard deviation of spark frequency (−0.306) | standard deviation of open circuit ratio (0.245) |
|---|---|---|
| mean value of short circuit ratio (−0.333) | standard deviation of short circuit ratio (−0.423) | mean value of short circuit time (−0.244) |
| standard deviation of average short circuit time (−0.287) | standard deviation of average delay time (−0.289) | mean value of average discharge duration (−0.351) |

In other embodiments, when the measurement values are actual measurement values of diameters measured from the bottom opening on the workpiece samples, the process features with correlation coefficients greater than 0.2 or smaller than −0.2 are listed in the Table 3. Therefore, process features in Table 3 with top five absolute values of correlation coefficients are selected to be used as the key features related to the diameter of the bottom opening (measurement item), such as the standard deviation of spark frequency, the standard deviation of average short circuit time, the standard deviation of average short circuit current, the standard deviation of average delay time and the mean value of average discharge duration.

TABLE 3 correlation coefficients between diameters of the bottom openings and the process features

| mean value of spark frequency (0.392) | standard deviation of spark frequency (0.531) | mean value of open circuit ratio (0.268) |
|---|---|---|
| standard deviation of open circuit ratio (0.223) | standard deviation of short circuit ratio (0.345) | standard deviation of average short circuit time (0.579) |
| mean value of average short circuit current (0.289) | standard deviation of average short circuit current (0.568) | mean value of average delay time (0.242) |
| standard deviation of average delay time (0.399) | mean value of average discharge duration (0.581) | standard deviation of average discharge duration (−0.272) |

It is noted that selecting the process features with correlation coefficients greater than 0.2 or smaller than −0.2 as the key features is not used to limit the present invention. In other processing conditions, a threshold value of the correlation coefficients can be varied according to different experiment requires to select the process features.

After obtaining the key features corresponding to each of the measurement items, the measurement values of the workpiece samples with respect to each of the measurement items and the sets of process data corresponding to the key features are used to build a predictive model which may be provided to build a predictive model, thereby predicting the precision of the electrical discharge machine. The aforementioned predictive model may be referred to U.S. Pat. No. 8,095,484, entitled "System and method for automatic virtual metrology", which is incorporated herein by reference.

Figure 18:
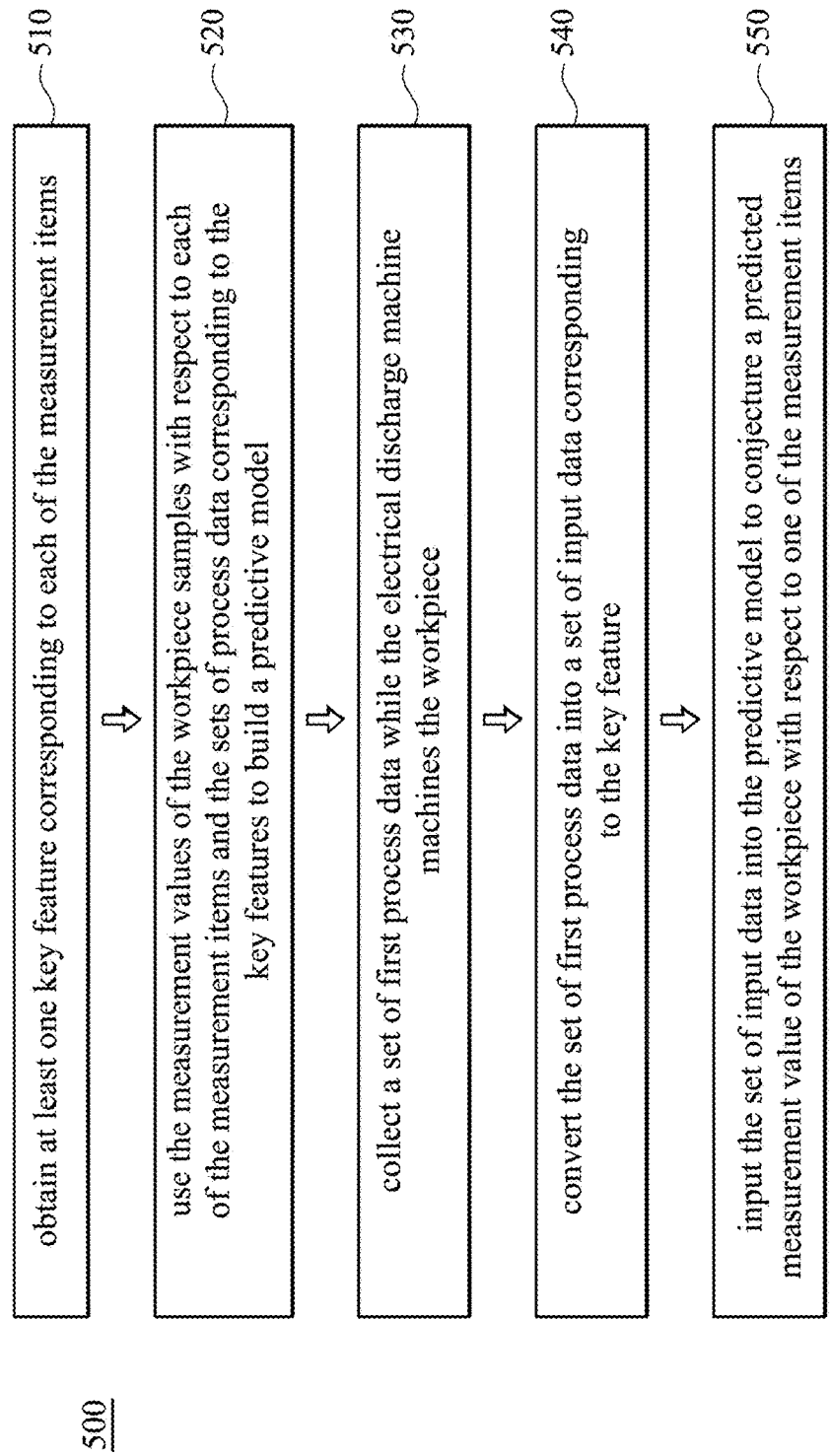
FIG. 18 is a flow chart showing a method for predicting precision of an electrical discharge machine in accordance with an embodiment of the present invention.

Referring to FIG. 18, FIG. 18 is a flow chart showing a method 500 for predicting precision of an electrical discharge machine in accordance with an embodiment of the present invention. The method 500 for predicting precision of the electrical discharge machine includes the following operations. An operation 510 is first performed to obtain at least one key feature corresponding to each of the measurement items. Thereafter, an operation 520 is performed to use the measurement values of the workpiece samples with respect to each of the measurement items and the sets of process data corresponding to the key features to build a predictive model corresponding to each of the measurement items. Then, an operation 530 is performed to operate the electrical discharge machine to machine a workpiece, and collect a set of first process data while the electrical discharge machine machines the workpiece. Thereafter, an operation 540 is performed to convert the set of first process data into a set of input data corresponding to the key feature. Then, an operation 550 is performed to input the set of input data into the predictive model to conjecture a predicted measurement value of the workpiece with respect to one of the measurement items, thereby predicting the precision of the electrical discharge machine. After the predicted measurement value of the workpiece with respect to one of the measurement items is obtained, a determination operation is performed to determine if the predicted measurement value is within an allowable range of a precision target value, thereby obtaining a determination result. When the determination result is no, a tool shutdown operation or a tool adjustment operation are performed on the electrical discharge machine. In some examples, the tool shutdown operation is to turn off the electrical discharge machine by using a controller. The tool adjustment operation is to adjust the process parameters, such as discharge voltage or discharge current, of the electrical discharge machine by using a controller.

Referring to Table 4, Table 4 shows predictive results of two predictive models built by an automatic virtual metrology system using the key features of the measurement values of the workpiece samples with respect to roughness of a bottom surface of an opening. In the present embodiment, the two predictive models are built respectively according to a Neural Network (NN) algorithm and a Partial Least Square (PLS) algorithm. In Table 4, mean absolutely errors (MAE) of the predictive models based on the NN algorithm and the PLS algorithm are 0.010 um. The 95% max error of the predictive model based on the NN algorithm and the 95% max error of the predictive model based on the PLS algorithm are 0.017 and 0.016 um both of which are smaller than two times of the standard deviation of the actual measurement values (i.e. Actual Y=0.015 um), meaning that the key features, such as the mean value of average short circuit current, the standard deviation of average short circuit current, the mean value of average delay time, the standard deviation of average delay time and the standard deviation of the average discharge energy, can be used to build accurate predictive models respectively according to the NN algorithm and the PLS algorithm for predicting the roughness of the bottom surfaces of the openings.

TABLE 4 predictive results of the roughness of the bottom surfaces of the openings

| precision (um) | MAE | | Max Error | | 95% Max Error | | 2 * Std. |
| --- | --- | --- | --- | --- | --- | --- | --- |
| | NN | PLS | NN | PLS | NN | PLS | Actual Y |
| | 0.010 | 0.010 | 0.017 | 0.019 | 0.017 | 0.016 | 0.015 |

Referring to Table 5, Table 5 shows predictive results of two predictive models built by an automatic virtual metrology system using the key features of the measurement values of the workpiece samples with respect to circularity of a bottom opening of an opening. In the present embodiment, the two predictive models are built respectively according to a Neural Network (NN) algorithm and a Partial Least Square (PLS) algorithm. In Table 5, the MAE of the predictive models based on the NN algorithm and the MAE of the predictive models based on the PLS algorithm are 0.005 and 0.004 um. The 95% max error of the predictive model based on the NN algorithm and the 95% max error of the predictive model based on the PLS algorithm are 0.006 and 0.011 um both of which are smaller than two times of the standard deviation of the actual measurement values (i.e. Actual Y=0.01), meaning that the key features, such as the mean value of spark frequency, the standard deviation of spark frequency, the mean value of short circuit ratio, the standard deviation of short circuit ratio and the mean value of average discharge duration, can be used to build accurate predictive models respectively according to the NN algorithm and the PLS algorithm for predicting the circularities of the bottom openings.

TABLE 5 predictive results of the circularities of the bottom openings

| precision (um) | MAE | | Max Error | | 95% Max Error | | 2 * Std. |
| --- | --- | --- | --- | --- | --- | --- | --- |
| | NN | PLS | NN | PLS | NN | PLS | Actual Y |
| | 0.005 | 0.004 | 0.012 | 0.012 | 0.006 | 0.011 | 0.010 |

Referring to Table 6, Table 6 shows predictive results of two predictive models built by an automatic virtual metrology system using the key features of the measurement values of the workpiece samples with respect to diameter of a bottom opening. In the present embodiment, the two predictive models are built respectively according to a Neural Network (NN) algorithm and a Partial Least Square (PLS) algorithm. In Table 6, the MAE of the predictive models based on the NN algorithm and the MAE of the predictive models based on the PLS algorithm are 0.007 and 0.008 um. The 95% max error of the predictive models based on the NN algorithm and the 95% max error of the predictive models based on the PLS algorithm are 0.012 um both of which are smaller than two times of the standard deviation of the actual measurement values (i.e. Actual I Y=0.017), meaning that the key features, such as the standard deviation of spark frequency, the standard deviation of average short circuit time, the standard deviation of average short circuit current, the standard deviation of average delay time and the mean value of average discharge duration, can be used to build accurate predictive models respectively according to the NN algorithm and the PLS algorithm for predicting the diameters of the bottom openings.

TABLE 6 predictive results of the diameters of the bottom openings

| precision (um) | MAE | | Max Error | | 95% Max Error | | 2 * Std. |
| --- | --- | --- | --- | --- | --- | --- | --- |
| | NN | PLS | NN | PLS | NN | PLS | Actual Y |
| | 0.007 | 0.006 | 0.012 | 0.012 | 0.011 | 0.012 | 0.017 |

It can be known from the above that, the process features are established by using the process data such as the discharge voltage signals and the discharge current signals that are collected from the electrical discharge machine, and the key features are selected from the process features and are provided for building an accurate predictive system to predict the precision of the electrical discharge machine, thereby increasing the processing quality.

On the other hand, the probability fitting method is used to select appropriate data from a huge amount of sample data to represent each of the process features. Meanwhile, the probability fitting method also may be used to reliably determine whether the mean value and the standard deviation of each set of the sample data represent the corresponding process feature.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for predicting precision of an electrical discharge machine, the method comprising:
   obtaining a plurality of sets of process data while the electrical discharge machine processes a plurality of workpiece samples, wherein each set of the process data comprises a plurality of discharge voltage signals and a plurality of discharge current signals;
   establishing a plurality of process features based on the process data;
   measuring each of the workpiece samples with respect to each of at least one measurement item by using at least one metrology tool, thereby obtaining a plurality of measurement values of the workpiece samples with respect to each of the at least one measurement item, wherein each of the measurement values is an actual measurement value of one of the workpiece samples after the one of the workpieces is processed by the electrical discharge machine according to its corresponding set of process data;

performing a correlation analysis operation to obtain a plurality of correlation coefficients between the process features of the workpiece samples and the measurement values of the workpiece samples with respect to each of the at least one measurement item;

selecting at least one key feature from the process features as representative according to the correlation coefficients;

using the measurement values of the workpiece samples with respect to each of the measurement items and the sets of process data corresponding to the key features to build a predictive model corresponding to each of the measurement items;

operating the electrical discharge machine to machine a workpiece, and collecting a set of first process data while the electrical discharge machine machines the workpiece; and converting the set of first process data into a set of input data corresponding to the key feature; and inputting the set of input data into the predictive model to conjecture a predicted measurement value of the workpiece with respect to one of the at least one measurement item, thereby predicting the precision of the electrical discharge machine.

2. The method of claim 1, wherein the operation of selecting the at least one key feature selects the process features with larger absolute values of correlation coefficients as representative, thereby obtaining the at least one key feature.

3. The method of claim 1, wherein the process features comprises a spark frequency, an open circuit ratio, a short circuit ratio, an average short circuit time, a standard deviation of short circuit time, an average short circuit current, a standard deviation of short circuit current, an average delay time, a standard deviation of delay time, an average discharge peak current, a standard deviation of peak current, an average discharge time, a standard deviation of discharge time, an average discharge energy and a standard deviation of discharge energy.

4. The method of claim 1, wherein the at least one measurement item comprises a roughness.

5. The method of claim 1, wherein the at least one measurement item comprises a diameter of a top opening, a circularity of the top opening, a bottom diameter of a bottom opening, and a circularity of the bottom opening, wherein the top opening and the bottom opening is formed by a drilling process performed by the electrical discharge machine.

6. A method for predicting precision of an electrical discharge machine, the method comprising:

obtaining a plurality of sets of process data corresponding to a plurality of workpiece samples while the electrical discharge machine processes the workpiece samples, wherein each set of the process data comprises a plurality of voltage signals and a plurality of current signals;

establishing a plurality of process features based on the process data;

collecting a plurality sets of sample data which correlate to the each of the process features;

performing distribution fitting to each of the sets of the sample data correlating to each of the process features by using a probability distribution fitting method, so as to determine whether an mean value and a standard deviation of each set of the sample data represent each of the process features, thereby obtaining a determination result;

measuring each of the workpiece samples with respect to each of at least one measurement item by using at least one metrology tool, thereby obtaining a plurality of measurement values of the workpiece samples with respect to each of the at least one measurement item, wherein each of the measurement values is an actual measurement value of one of the workpiece samples after the one of the workpiece samples is processed by the electrical discharge machine according to its corresponding set of process data;

performing a correlation analysis operation to obtain a plurality of correlation coefficients between the process features of the workpiece samples and the measurement values of the workpiece samples with respect to each of the at least one measurement item;

selecting at least one key feature from the process features as representative according to the correlation coefficients;

using the measurement values of the workpiece samples with respect to each of the measurement items and the sets of process data corresponding to the key features to build a predictive model corresponding to each of the measurement items;

operating the electrical discharge machine to machine a workpiece, and collecting a set of first process data while the electrical discharge machine machines the workpiece; and converting the set of first process data into a set of input data corresponding of the key feature; and inputting the at least one set of input data into the predictive model to conjecture a predicted measurement value of the workpiece with respect to one of the at least one measurement item, thereby predicting the precision of the electrical discharge machine.

7. The method of claim 6, wherein the operation of selecting the at least one key feature selects the process features with larger absolute values of correlation coefficients as representative, thereby obtaining the at least one key feature.

8. The method of claim 6, wherein the probability fitting method comprises a normal distribution method, a Weibull distribution method, or a Gamma distribution method.

9. The method of claim 6, wherein the distribution fitting determines whether the set of sample data fits a normal distribution, wherein when the set of the sample data fits the normal distribution, the mean value and the standard deviation of the set of the sample data represent a corresponding process feature.

10. The method of claim 6, wherein a Probability-Probability plot (P-P plot) and a Quantile-Quantile Plot (Q-Q plot) are generated by the distribution fitting to analyze whether the distribution of the sample data fits an ideal distribution curve, wherein when the distribution of the sample data fits the ideal distribution curve, the mean value and the standard deviation of the set of the sample data represent the overall process feature.

11. The method of claim 6, wherein the process features comprises a spark frequency, an open circuit ratio, a short circuit ratio, an average short circuit time, a standard deviation of short circuit time, an average short circuit current, a standard deviation of short circuit current, an average delay time, a standard deviation of delay time, an average discharge peak current, a standard deviation of peak current, an average discharge time, a standard deviation of discharge time, an average discharge energy and a standard deviation of discharge energy.

12. The method of claim 6, wherein the at least one measurement item comprises a roughness.

13. The method of claim 6, wherein the at least one measurement item comprises a diameter of a top opening, a circularity of the top opening, a bottom diameter of a bottom opening, and a circularity of the bottom opening, wherein the top opening and the bottom opening is formed by a drilling process performed by the electrical discharge machine.

* * * * *